US010212188B2

United States Patent
Chasin et al.

(10) Patent No.: US 10,212,188 B2
(45) Date of Patent: Feb. 19, 2019

(54) TRUSTED COMMUNICATION NETWORK

(71) Applicant: McAfee, LLC, Santa Clara, CA (US)

(72) Inventors: C. Scott Chasin, Denver, CO (US); Wei Lin, Denver, CO (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/830,545

(22) Filed: Aug. 19, 2015

(65) Prior Publication Data

US 2015/0358352 A1 Dec. 10, 2015

Related U.S. Application Data

(63) Continuation of application No. 11/465,433, filed on Aug. 17, 2006, now Pat. No. 9,160,755, which is a
(Continued)

(51) Int. Cl.
 *H04L 29/06* (2006.01)
(52) U.S. Cl.
 CPC ........ *H04L 63/1483* (2013.01); *H04L 63/126* (2013.01); *H04L 63/14* (2013.01);
(Continued)
(58) Field of Classification Search
 CPC ..... H04L 63/14; H04L 51/12; H04L 63/1416; H04L 61/307; H04L 63/1441; H04L 63/1483
 See application file for complete search history.

(56) References Cited

U.S. PATENT DOCUMENTS

| 4,771,400 A | 9/1988 | Omura et al. |
| 4,868,376 A | 9/1989 | Lessin et al. |

(Continued)

FOREIGN PATENT DOCUMENTS

| EP | 1949240 | 7/2008 |
| JP | 2001-265674 | 9/2001 |

(Continued)

OTHER PUBLICATIONS

Dawson et al, "vCard MIME Directory Profile", Sep. 1998; Nework Working Group, RFC 2426; 39 pages.
Miyake et al., "A Method to Detect Unknown Computer Virus Using Virtual Server,", Technical Report of Information Processing Society of Japan, 2002-CSEC-18, Jul. 19, 2002.
"Allegro Mailzone Filters Junk E-Mail," Law Technology Product News, vol. 6, Issue 3, Mar. 1999, available at www.webarchive.org, downloaded Apr. 29, 2006 (1 page).

(Continued)

*Primary Examiner* — Asad M Nawaz
*Assistant Examiner* — Najeeb Ansari
(74) *Attorney, Agent, or Firm* — Patent Capital Group

(57) ABSTRACT

A system includes a processing node configured to send authorized inbound messages to registered enterprise networks. An authorized message is a message that includes trusted source indicia. Trusted source indicia indicates that the message was sent by one or more of the processing node or an authenticated message transfer node associated with one of the registered enterprise networks. The system may further include an administration node configured to maintain registration of a plurality of message transfer nodes associated with the enterprise networks. A method includes receiving outbound messages from an authenticated message transfer node of an enterprise network, screening the messages for threats to determine whether to send the messages to associated recipients, applying a first message identifier to each message, wherein the first message identifier can be used to track the message and, for each message, sending the message to the associated recipient if no threats are detected in the message.

26 Claims, 14 Drawing Sheets

Related U.S. Application Data continuation-in-part of application No. 11/365,130, filed on Feb. 28, 2006, now Pat. No. 7,953,814, and a continuation-in-part of application No. 11/315,480, filed on Dec. 21, 2005, now Pat. No. 8,484,295.

(60) Provisional application No. 60/734,519, filed on Nov. 7, 2005, provisional application No. 60/657,038, filed on Feb. 28, 2005, provisional application No. 60/638,208, filed on Dec. 21, 2004, provisional application No. 60/693,927, filed on Jun. 23, 2005.

(52) U.S. Cl.
CPC ...... *H04L 63/1416* (2013.01); *H04L 63/0227* (2013.01); *H04L 63/1408* (2013.01)

(56) References Cited

U.S. PATENT DOCUMENTS

| | | | |
|---|---|---|---|
| 4,932,054 | A | 6/1990 | Chou et al. |
| 4,967,389 | A | 10/1990 | Omura et al. |
| 4,972,474 | A | 11/1990 | Sabin |
| 5,081,676 | A | 1/1992 | Chou et al. |
| 5,210,710 | A | 5/1993 | Omura |
| 5,222,133 | A | 6/1993 | Chou et al. |
| 5,337,357 | A | 8/1994 | Chou et al. |
| 5,546,463 | A | 8/1996 | Caputo et al. |
| 5,627,764 | A | 5/1997 | Schutzman et al. |
| 5,638,444 | A | 6/1997 | Chou et al. |
| 5,704,008 | A | 12/1997 | Duvall, Jr. |
| 5,737,424 | A | 4/1998 | Elteto et al. |
| 5,778,071 | A | 7/1998 | Caputo et al. |
| 5,790,790 | A | 8/1998 | Smith et al. |
| 5,796,833 | A | 8/1998 | Chen et al. |
| 5,826,011 | A | 10/1998 | Chou et al. |
| 5,878,142 | A | 3/1999 | Caputo et al. |
| 5,884,033 | A | 3/1999 | Duvall et al. |
| 5,937,161 | A | 8/1999 | Mulligan et al. |
| 5,937,162 | A | 8/1999 | Funk et al. |
| 5,987,610 | A | 11/1999 | Franczek et al. |
| 5,996,077 | A | 11/1999 | Williams |
| 6,003,027 | A | 12/1999 | Prager |
| 6,005,940 | A | 12/1999 | Kulinets |
| 6,021,438 | A | 2/2000 | Duvvoori et al. |
| 6,052,709 | A | 4/2000 | Paul |
| 6,061,448 | A | 5/2000 | Smith et al. |
| 6,073,142 | A | 6/2000 | Geiger et al. |
| 6,119,137 | A | 9/2000 | Smith et al. |
| 6,128,741 | A | 10/2000 | Goetz et al. |
| 6,141,686 | A | 10/2000 | Jackowski et al. |
| 6,151,675 | A | 11/2000 | Smith |
| 6,161,130 | A | 12/2000 | Horvitz et al. |
| 6,167,136 | A | 12/2000 | Chou |
| 6,192,360 | B1 | 2/2001 | Dumais et al. |
| 6,192,407 | B1 | 2/2001 | Smith et al. |
| 6,195,425 | B1 | 2/2001 | Farris |
| 6,240,436 | B1 | 5/2001 | McGregor |
| 6,249,805 | B1 | 6/2001 | Fleming, III |
| 6,266,692 | B1 | 7/2001 | Greenstein |
| 6,278,782 | B1 | 8/2001 | Ober et al. |
| 6,282,290 | B1 | 8/2001 | Powell et al. |
| 6,282,657 | B1 | 8/2001 | Kaplan et al. |
| 6,307,936 | B1 | 10/2001 | Ober et al. |
| 6,321,267 | B1 | 11/2001 | Donaldson |
| 6,381,634 | B1 | 4/2002 | Tello et al. |
| 6,385,655 | B1 | 5/2002 | Smith et al. |
| 6,389,455 | B1 | 5/2002 | Fuisz |
| 6,393,465 | B2 | 5/2002 | Leeds |
| 6,397,331 | B1 | 5/2002 | Ober et al. |
| 6,400,810 | B1 | 6/2002 | Skladman et al. |
| 6,412,069 | B1 | 6/2002 | Kavsan |
| 6,421,709 | B1 | 7/2002 | McCormick et al. |
| 6,434,585 | B2 | 8/2002 | McGregor et al. |
| 6,438,583 | B1 | 8/2002 | McDowell et al. |
| 6,438,612 | B1 | 8/2002 | Ylonen et al. |
| 6,453,415 | B1 | 9/2002 | Ober |
| 6,460,050 | B1 | 10/2002 | Pace et al. |
| 6,463,538 | B1 | 10/2002 | Elteto |
| 6,470,086 | B1 | 10/2002 | Smith |
| 6,487,599 | B1 | 11/2002 | Smith et al. |
| 6,493,007 | B1 | 12/2002 | Pang |
| 6,507,866 | B1 | 1/2003 | Barchi |
| 6,523,119 | B2 | 2/2003 | Paulin |
| 6,529,956 | B1 | 3/2003 | Smith et al. |
| 6,546,416 | B1 | 4/2003 | Kirsch |
| 6,587,549 | B1 | 7/2003 | Weik |
| 6,609,196 | B1 | 8/2003 | Dickinson, III et al. |
| 6,615,241 | B1 | 9/2003 | Miller et al. |
| 6,615,242 | B1 | 9/2003 | Riemers |
| 6,618,747 | B1 | 9/2003 | Flynn et al. |
| 6,631,472 | B2 | 10/2003 | Kaplan et al. |
| 6,643,686 | B1 | 11/2003 | Hall |
| 6,643,687 | B1 | 11/2003 | Dickie et al. |
| 6,643,688 | B1 | 11/2003 | Fuisz |
| 6,650,890 | B1 | 11/2003 | Irlann et al. |
| 6,651,166 | B1 | 11/2003 | Smith et al. |
| 6,654,465 | B2 | 11/2003 | Ober et al. |
| 6,654,787 | B1 | 11/2003 | Aronson et al. |
| 6,671,808 | B1 | 12/2003 | Abbott et al. |
| 6,678,734 | B1 | 1/2004 | Haatainen et al. |
| 6,704,871 | B1 | 3/2004 | Kaplan et al. |
| 6,708,273 | B1 | 3/2004 | Ober et al. |
| 6,711,615 | B2 | 3/2004 | Porras et al. |
| 6,725,381 | B1 | 4/2004 | Smith et al. |
| 6,732,101 | B1 | 5/2004 | Cook |
| 6,732,157 | B1 | 5/2004 | Gordon et al. |
| 6,748,529 | B2 | 6/2004 | Smith |
| 6,757,830 | B1 | 6/2004 | Tarbotton et al. |
| 6,769,016 | B2 | 7/2004 | Rothwell et al. |
| 6,772,196 | B1 | 8/2004 | Kirsch et al. |
| 6,802,012 | B1 | 10/2004 | Smithson et al. |
| 6,826,609 | B1 | 11/2004 | Smith et al. |
| 6,829,635 | B1 | 12/2004 | Townshend |
| 6,842,773 | B1 | 1/2005 | Ralston et al. |
| 6,847,825 | B1 | 1/2005 | Duvall et al. |
| 6,850,602 | B1 | 2/2005 | Chou |
| 6,868,498 | B1 | 3/2005 | Katsikas |
| 6,876,858 | B1 | 4/2005 | Duvall et al. |
| 6,901,509 | B1 | 5/2005 | Kocher |
| 6,907,571 | B2 | 6/2005 | Slotznick |
| 6,912,285 | B2 | 6/2005 | Jevans |
| 6,941,348 | B2 | 9/2005 | Petry et al. |
| 6,944,616 | B2 | 9/2005 | Ferguson et al. |
| 6,963,929 | B1 | 11/2005 | Lee |
| 7,016,939 | B1 | 3/2006 | Rothwell et al. |
| 7,020,642 | B2 | 3/2006 | Ferguson et al. |
| 7,051,077 | B2 | 5/2006 | Lin |
| 7,062,498 | B2 | 6/2006 | Al-Kofahi et al. |
| 7,072,942 | B1 | 7/2006 | Maller |
| 7,089,241 | B1 | 8/2006 | Alspector et al. |
| 7,107,254 | B1 | 9/2006 | Dumais et al. |
| 7,133,660 | B2 | 11/2006 | Irlam et al. |
| 7,145,875 | B2 | 12/2006 | Allison et al. |
| 7,178,030 | B2 | 2/2007 | Scheidt et al. |
| 7,181,764 | B2 | 2/2007 | Zhu et al. |
| 7,213,260 | B2 | 5/2007 | Judge |
| 7,219,148 | B2 | 5/2007 | Rounthwaite et al. |
| 7,266,508 | B1 | 9/2007 | Owen et al. |
| 7,287,060 | B1 | 10/2007 | McCown et al. |
| 7,320,020 | B2 | 1/2008 | Chadwick et al. |
| 7,360,165 | B2 | 4/2008 | Cortright et al. |
| 7,401,148 | B2 | 7/2008 | Lewis |
| 7,428,410 | B2 | 9/2008 | Petry et al. |
| 7,472,422 | B1 | 12/2008 | Agbabian |
| 7,506,155 | B1 | 3/2009 | Stewart et al. |
| 7,596,600 | B2 | 9/2009 | Quine et al. |
| 7,610,344 | B2 | 10/2009 | Mehr et al. |
| 7,657,935 | B2 | 2/2010 | Stolfo et al. |
| 7,680,890 | B1 | 3/2010 | Lin |
| 7,870,240 | B1 | 1/2011 | Horvitz et al. |
| 7,953,814 | B1 | 5/2011 | Chasin et al. |
| 7,970,832 | B2 | 6/2011 | Perry et al. |
| 8,042,491 | B2 | 10/2011 | Abdelaziz |

(56) References Cited

U.S. PATENT DOCUMENTS

| | | |
|---|---|---|
| 8,363,793 B2 | 1/2013 | Chasin et al. |
| 8,484,295 B2 | 7/2013 | Chasin et al. |
| 8,531,414 B2 | 9/2013 | Huibers |
| 8,738,708 B2 | 5/2014 | Chasin |
| 9,015,472 B1 | 4/2015 | Chasin |
| 9,160,755 B2 | 10/2015 | Chasin |
| 9,560,064 B2 | 1/2017 | Chasin et al. |
| 2002/0007453 A1 | 1/2002 | Nemovicher |
| 2002/0059454 A1 | 5/2002 | Barrett et al. |
| 2002/0120697 A1* | 8/2002 | Generous ............... H04L 29/06 709/206 |
| 2002/0188863 A1 | 12/2002 | Friedman |
| 2002/0199095 A1 | 12/2002 | Bandini et al. |
| 2003/0009698 A1 | 1/2003 | Lindeman et al. |
| 2003/0023736 A1 | 1/2003 | Abkemeier |
| 2003/0061506 A1 | 3/2003 | Cooper et al. |
| 2003/0074413 A1 | 4/2003 | Nielsen et al. |
| 2003/0101181 A1 | 5/2003 | Al-Kofahi et al. |
| 2003/0158905 A1 | 8/2003 | Petry et al. |
| 2003/0167402 A1* | 9/2003 | Stolfo ................. H04L 63/1425 726/23 |
| 2003/0172294 A1 | 9/2003 | Judge |
| 2003/0177387 A1 | 9/2003 | Osterwalder et al. |
| 2003/0187937 A1 | 10/2003 | Yao et al. |
| 2003/0187942 A1 | 10/2003 | Quine et al. |
| 2003/0212546 A1 | 11/2003 | Shaw |
| 2003/0220978 A1 | 11/2003 | Rhodes |
| 2003/0236835 A1 | 12/2003 | Levi et al. |
| 2003/0236847 A1 | 12/2003 | Benowitz et al. |
| 2004/0058673 A1 | 3/2004 | Irlam et al. |
| 2004/0078334 A1 | 4/2004 | Malcolm et al. |
| 2004/0088369 A1 | 5/2004 | Yeager et al. |
| 2004/0088551 A1 | 5/2004 | Dor et al. |
| 2004/0177110 A1 | 9/2004 | Rounthwaite et al. |
| 2004/0177120 A1 | 9/2004 | Kirsch |
| 2004/0177271 A1* | 9/2004 | Arnold ................. G06Q 10/107 713/154 |
| 2004/0199597 A1 | 10/2004 | Libbey et al. |
| 2004/0267893 A1 | 12/2004 | Lin |
| 2005/0010644 A1 | 1/2005 | Brown et al. |
| 2005/0015626 A1 | 1/2005 | Chasin |
| 2005/0021649 A1 | 1/2005 | Goodman et al. |
| 2005/0044153 A1 | 2/2005 | Gross |
| 2005/0044170 A1 | 2/2005 | Cox et al. |
| 2005/0063365 A1 | 3/2005 | Mathew et al. |
| 2005/0064850 A1 | 3/2005 | Irlam et al. |
| 2005/0076084 A1 | 4/2005 | Loughmiller et al. |
| 2005/0076220 A1 | 4/2005 | Zhang et al. |
| 2005/0080816 A1 | 4/2005 | Shipp |
| 2005/0081059 A1 | 4/2005 | Bandini et al. |
| 2005/0091272 A1 | 4/2005 | Smith et al. |
| 2005/0125667 A1 | 6/2005 | Sullivan et al. |
| 2005/0149726 A1* | 7/2005 | Joshi ................... G06F 21/51 713/164 |
| 2005/0149747 A1 | 7/2005 | Wesinger et al. |
| 2005/0182959 A1 | 8/2005 | Petry et al. |
| 2005/0182960 A1 | 8/2005 | Petry et al. |
| 2005/0198159 A1 | 9/2005 | Kirsch |
| 2005/0198170 A1* | 9/2005 | Lemay ................. H04L 12/58 709/206 |
| 2005/0198182 A1 | 9/2005 | Prakash et al. |
| 2005/0240617 A1 | 10/2005 | Lund et al. |
| 2005/0259667 A1 | 11/2005 | Vinokurov et al. |
| 2005/0266832 A1 | 12/2005 | Irlam et al. |
| 2006/0015726 A1 | 1/2006 | Callas |
| 2006/0026242 A1 | 2/2006 | Kuhlman |
| 2006/0031483 A1 | 2/2006 | Lund et al. |
| 2006/0039540 A1 | 2/2006 | Issinski |
| 2006/0047766 A1 | 3/2006 | Spadea |
| 2006/0075497 A1 | 4/2006 | Garg |
| 2006/0080432 A1 | 4/2006 | Spataro et al. |
| 2006/0080613 A1 | 4/2006 | Savant |
| 2006/0085505 A1* | 4/2006 | Gillum ................. G06Q 10/107 709/206 |
| 2006/0095524 A1* | 5/2006 | Kay ..................... G06Q 10/107 709/206 |
| 2006/0149823 A1 | 7/2006 | Owen et al. |
| 2006/0168006 A1 | 7/2006 | Shannon et al. |
| 2006/0168024 A1 | 7/2006 | Mehr et al. |
| 2006/0168057 A1 | 7/2006 | Warren et al. |
| 2006/0277220 A1 | 12/2006 | Patrick et al. |
| 2006/0277597 A1 | 12/2006 | Dreymann |
| 2007/0008987 A1 | 1/2007 | Manion et al. |
| 2007/0011252 A1 | 1/2007 | Taylor et al. |
| 2007/0044152 A1 | 2/2007 | Newman et al. |
| 2007/0067392 A1 | 3/2007 | Torres et al. |
| 2007/0100949 A1 | 5/2007 | Hulten et al. |
| 2007/0106698 A1 | 5/2007 | Elliott et al. |
| 2007/0107059 A1 | 5/2007 | Chasin et al. |
| 2007/0214227 A1 | 9/2007 | Quinn |
| 2007/0244974 A1 | 10/2007 | Chasin |
| 2008/0294726 A1* | 11/2008 | Sidman ............. H04L 29/12386 709/206 |
| 2009/0319781 A1 | 12/2009 | Byrum et al. |
| 2010/0030858 A1 | 2/2010 | Chasin |
| 2011/0187652 A1 | 8/2011 | Huibers |
| 2011/0191438 A1 | 8/2011 | Huibers et al. |
| 2011/0191823 A1 | 8/2011 | Huibers |
| 2011/0197275 A1 | 8/2011 | Maes |
| 2013/0041955 A1 | 2/2013 | Chasin et al. |
| 2013/0117397 A1 | 5/2013 | Chasin et al. |
| 2013/0130714 A1 | 5/2013 | Huibers et al. |
| 2013/0217335 A1 | 8/2013 | Huibers et al. |
| 2013/0326622 A9 | 12/2013 | Chasin et al. |
| 2014/0141818 A1 | 5/2014 | Yoakum |
| 2015/0142905 A1 | 5/2015 | Chasin |
| 2016/0156654 A1 | 6/2016 | Chasin et al. |

FOREIGN PATENT DOCUMENTS

| | | |
|---|---|---|
| JP | 2004-287790 | 10/2004 |
| JP | 2009515426 | 4/2009 |
| WO | WO 2005/006139 | 1/2005 |
| WO | WO 2005/010692 | 2/2005 |
| WO | WO 2007/055770 | 5/2007 |

OTHER PUBLICATIONS

"Allegro messaging company has protected 1,000 businesses from viruses," Dayton Business Journal, Jun. 11, 1999, available at www.dayton.biziomals.com, downloaded Apr. 29, 2006 (3 pages).

"Allegro's Mailzone Blocks Illegal MP3 Files," Allegro.net press release, Jul. 14, 1999, available at www.webarchive.org, downloaded Apr. 29, 2006 (2 pages).

"Allegro's Mailzone Stops Back Orifice 2000," Allegro.net press release Jul. 14, 1999, available at www.webarchive.org, downloaded Apr. 29, 2006 (2 pages).

"Allegro's Mailzone Stops Back Orifice 2000," Allegro.net press release, Jul. 15, 1999, available at www.webarchive.org, downloaded Apr. 29, 2006 (2 pages).

"Allegro's Mailzone Stops 'Worm' While on the Net," Allegro.net press release, Jun. 10, 1999, available at www.webarchive.org, downloaded Apr. 29, 2006 (2 pages).

"Allegro's Richard Bliss to speak at upcoming 'E-mail Outsourcing' conference," Allegro.net press release, Jun. 2, 1999, available at www.webarchive.org, downloaded Apr. 29, 2006 (1 page).

"Phantom Menace a real menace to network administrators," Allegro.net press release, Apr. 28, 1999, available at www.webarchive.org, downloaded Apr. 29, 2006 (2 pages).

Yoshimi et al., "Proposal of Nat/Proxy Traversing Remote Access Technology," Technical Report of the Institute of Electronics, Information and Communication Engineers, NS2005-84, Sep. 8, 2005.

Takata, Manabu "Servey [sic] & Choice, Mail Filtering Software—Excellently High Degree of Freedom in Setting Up—Applicability to Coded Emails Starting," Nikkei Communications, No. 302, Sep. 20, 1999, pp. 121-127.

Bhattacharyya, Manasi, et al., Research paper, "MET: An Experimental System for Malicious Email Tracking," Columbia University and Cornell University, published 2002 (11 pages).

(56) References Cited

OTHER PUBLICATIONS

Corporate Factsheet 2005,Clearswift Ltd., downloaded Nov. 6, 2005 (12 pages).
Graham, Better Bayesian Filtering, Jan. 2003 (12 pages).
Gupta, A., et al., Research paper, "An Approach for Detecting Self-Propagating Email Using Anamoly Detection," Department of Computer Science, Stony Brook University, published 2003 (18 pages).
Lindberg, G., RFC 2505—Anti-Spam Recommendations for SMTP MTAs, The Internet Society, Feb. 1999, available at http://www.fags.org/rfcs/rfc2505.html, downloaded Nov. 6, 2005 (19 pages).
Listsery 14.5@ Miami University, "Allegro Mailzone Filters Unwanted E-mail," Jan. 25, 1999, available at www.listserv.muohio.edu, downloaded Apr. 29, 2006 (6 pages).
M. Sahami, S. Dumais, D. Heckerman, and E. Horvitz, "A Bayesian approach to filtering junk e-mail", in Learning for Text Categorization—Papers from the AAAI Workshop, pp. 55-62, Madison, Wisconsin, 1998 (8 pages).
Mail Abuse Prevention System, LLC, Basic Mailing List Management Guidelines for Preventing Abuse, available at http://web.archive.org/web/20010309004654/maps.vix.com/manage.html, downloaded Nov. 6, 2005 (3 pages).
Mailzone—Message Management Services—Mail Watch Next Generation, Web Site, available at www.webarchive.org, downloaded Apr. 29, 2006 (22 pages).
McNamara, Paul, "Take my apps—please," NetworkWorld, May 31, 1999, available at www.networkworld.com, downloaded Apr. 29, 2006 (7 pages).
Peer-to-Peer (P2P) Roadmap; Website: http://msdn2.microsoft.com/en-us/library/bb756997(printer).aspx, date retrieved Feb. 1, 2008, 4 pages.
People Near Me; Microsoft Tech Net, Website: http://technet.microsoft.com/en-us/library/bb726969(printer).aspx, published Sep. 27, 2006, date retrieved Feb. 1, 2008, 6 pages.
Postfix.org web site, available at http://www.postfix.org, downloaded Nov. 6, 2005 (251 pages).
Sendmail, Inc., Sendmail.org home page, available at http://www.sendmail.org/, downloaded Nov. 6, 2005 (110 pages).
Sergeant, Internet Level Spam Detection and SpannAssassin 2.50, MessageLabs, http://spamassassin.apache.org/presentations/SpamConf2003.pdf, 2003 (21 pages).
Stolfo, Salvatore J., et al., Research paper, "Combining Behavior Models to Secure E-Mail Systems," Columbia University, May 16, 2003 (14 pages).
Stolfo, Salvatore J., et al.,Research paper, "Detecting Viral Propagations Using Email Behavior Profiles," Columbia University, 2003 (47 pages).
Thyfault, Mary E., "Companies choose outside e-mail services for cost, functionality, and easy administration," Information Week, Aug. 2, 1999, available at www.informationweek.com, downloaded Apr. 29, 2006 (5 pages).
Woitaszek, M.; Shaaban, M.; Czemikowski, R., "Identifying junk electronic mail in Microsoft outlook with a support vector machine," Proceedings of the 2003 Symposium on Application and the Internet, Jan. 27-31, 2003 (4 pages).
Zachariassen, Rayan, Zmailer The Manual, v. 1.99.26.200602020935, available at http://www.smailer.org/zman/zmanual.shtml, downloaded Apr. 28, 2006 (312 pages).
"ActivIdentity Technology Brief, Solutions for Strong Authenticiation" ActivIdentity, Copyright 2007 (2 pages).
"Actividentity Technology Brief, Device and Credential Management," ActivIdentity, Copyright 2006 (2 pages).
"Device and Credential Management Solutions", ActivIdentity, www.actividentity.com, Jul. 3, 2007 (2 pages).
"Actividentity, Technology Brief, Secure Information and Transactions", ActivIdentity, Copyright 2006 (2 pages).
"ActivIdentity, Technology Brief, Enterprise Single Sign-On," Copyright 2006 (2 pages).
"Strong Authentication Solutions", ActivIdentity, www.actividentity.com, Jul. 4, 2007.

Rodger, Allan, "Technology Audit, Security, ActivIdentity Smart Employee ID," Butler Group Subscription Services, TA00011173SEC, Jan. 2007 (8 pages).
Hudson, Sally, "White Paper—ActivIdentity: Digital Proof of Identity for Evolving Ecosystems," IDC sponsored by ActivIdentity, Oct. 2006 (13 pages).
"Apply for the Bump API now!", Bump Technologies, Inc., www.bu.mp, Dec. 25, 2009 (2 pages).
"Frequently Asked Questions", Bump Technogies, Inc., www.bu.mp, Dec. 26, 2009 (2 pages).
Kincaid, Jason, "Bump Shares Its Phone Tapping, Data Swapping Technology with New API", TechCrunch, Dec. 22, 2009 (1 page).
Kincaid, Jason, "Bump Goes Cross-Platform with New Android App; Upgrades iPhone Version Too", TechCrunch, Nov. 11, 2009 (1 page).
"Bump Technologies, for iPhone, Android", Bump Technologies, Inc., www.bu.mp, May 22, 2010 (1 page).
Webpage, Products, Ping Identity Corporation, www.pingidentity.com, Dec. 13, 2002 (1 page).
"PingID Network Provides Enterprises with Complete Business Framework for Inter-Company Identity Management," Ping Identity Corporation, www.pingidentity.com, Jan. 28, 2003 (2 pages).
"PingID, Addressing Identity Fraud," Ping Identity Corporation, Mar. 16, 2013 (15 pages).
"Ping Identity Releases SourcID SSO, an Open Source, Liberty Complaint Toolkit for Federated Identity and Single Sing-On," Ping Identity Corporation, Jan. 20, 2003 (2 pages).
Norlin et al., "Federated Identity Management, Corporate Strategies for Managing Security, Liability, Scalability and the Risk of Fraud as Identity Moves Toward Federation," PingID, www.pingidentity.com, Copyright 2003 (12 pages).
"Federation Primer, Digital Identity Basics," PingIdentity Corporation, Copyright 2004 (6 pages).
Elliot, et a., "Scenarios for Identity Federation and Drivers of the Identity Network," Ping Identity Corporation and Nokio Innovent, Copyright 2004 (24 pages).
"White Paper, 5 Steps to Secure Internet SSO," PingIdentity Corporation, Copyright 2008 (6 pages).
"iKey 1000 Two-Factor Authentication for Your Digital Identity," SafeNet, Inc., www.safenet-inc.com, Feb. 13, 2005 (2 pages).
"SafeNet VPN Solutions," SafeNet, Inc., www.safenet-inc.com, Feb. 13, 2005 (2 pages).
"An IPSec CPN Gateway with GigaBit Performance, Low Latency, and Tigh Throughput", SafeNet, Inc., www.safenet-inc.com, Feb. 13, 2005.
"Efficient Cryptographic Association," SafeNet, Inc., www.safenet-inc.com, Dec. 12, 204 (1 page).
"iKey 1000, Workstation Security and Secure Remote Access," SafeNet, Inc., Copyright 2004 (2 pages).
"Welcome to SafeNet, Inc.'s Online Store for SafeNet Products", SafeNet, Inc. www.soft-pk.com, Nov. 17, 2000 (3 pages).
"SSL-Based Remote Access," SafeNet, Inc. www-safenet-inc.com, Mar. 5, 2005 (2 pages).
"SafeEnterprise SSL iGate", SafeNet, Inc., Copyright 2005 (2 pages).
"DocuSign Express, Features and Benefits", DocuSign, Inc., www.docusign.com, Jun. 16, 2004 (2 pages).
"DocuSign Express makes it Easy and Fast," DocuSign, Inc., www.docusign.com, Jul. 11, 2004 (3 pages).
"New Norton Anti-theft to Protect Lost or Stolen Laptops, Smartphones and Tablets", Symantec Corporation, Oct. 4, 2011 (6 pages).
PCT International Search Report and Written Opinion in PCT International Application No. PCT/US04/20899 dated Aug. 4, 2006.
PCT International Preliminary Report on Patentability in PCT International Application No. PCT/US04/20899 dated Oct. 3, 2006.
PCT International Search Report and Written Opinion in PCT International Application No. PCT/US04/22846 dated Dec. 2, 2005.
PCT International Preliminary Report on Patentability in PCT International Application No. PCT/US04/22846 dated Feb. 17, 2009.
PCT International Search Report and Written Opinion in PCT International Application Serial No. PCT/US2006/32402 dated Mar. 25, 2008.

(56) References Cited

OTHER PUBLICATIONS

PCT International Preliminary Report on Patentability in PCT International Application Serial No. PCT/US2006/32402 dated Mar. 24, 2009.
European Patent Office Extended Search Report, Search Opinion, and Examiner's Preliminary Opinion in EPO Patent Application Serial No. 06789864.3-1244 dated Feb. 16, 2012.
European Patent Office Communication Pursuant to Article 94(3) EPC (Examination Report) in EP Application Serial No. 06789864.3 dated Aug. 16, 2013.
Japan Patent Office First Office Action in Japanese Patent Application No. 2008-538876 dated Apr. 18, 2011.
Japan Patent Office Final Office Action for Japanese Patent Application No. 2008-538876 dated Aug. 30, 2011.
Japan Patent Office Final Refusal in Japanese Patent Application Serial No. 2008-538876 dated Dec. 13, 2011.
European Patent Office Communication Pursuant to Article 94(3) EPC (Examination Report) in EP Application Serial No. 067898643 dated Apr. 17, 2018, 6 pages.

\* cited by examiner

TRUSTED COMMUNICATION NETWORK

CROSS-REFERENCE TO RELATED APPLICATIONS

This Application is a continuation (and claims the benefit of priority under 35 U.S.C. § 120) of U.S. patent application Ser. No. 11/465,433 filed on Aug. 17, 2006 and entitled TRUSTED COMMUNICATION NETWORK, which claims the benefit of U.S. Provisional Patent Application Ser. No. 60/734,519, filed on Nov. 7, 2005. U.S. patent application Ser. No. 11/465,433 is also a continuation-in-part of U.S. patent application No. 11/365,130, filed on Feb. 28, 2006, now issued as U.S. Pat. No. 7,953,814. U.S. patent application Ser. No. 11/365,130 in turn claims the benefit of priority to U.S. Provisional Patent Application Ser. No. 60/657,038, filed on Feb. 28, 2005. U.S. patent application Ser. No. 11/465,433 is also a continuation-in-part of U.S. patent application Ser. No. 11/315,480, filed on Dec. 21, 2005. U.S. patent application Ser. No. 11/315,480 in turn claims the benefit of priority to U.S. Provisional Patent Application Ser. No. 60/638,208 filed on Dec. 21, 2004 and U.S. Provisional Patent Application Ser. No. 60/693,927 filed on Jun. 23, 2005. This application is related to U.S. application Pat. Ser. No. 11/372,970, filed on Mar. 10, 2006. Each of the aforementioned patent applications are hereby incorporated by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006 MXTN, Inc. and MX Logic, Inc.

BACKGROUND

Today organizations and individuals are bombarded by vast amounts of Internet and email "pollution". Spam, worms, phishing attacks, spyware, adware, email address spoofing, and other types of network pollutants are ever increasing. For example, in come cases spam can account for as much as 75-80% of inbound email. Tremendous amounts of time, money, and productivity are spent every year attempting to filter out and stop pollutants in inbound email. Today, firewalls, anti-virus, anti-spam, and anti-spyware software, for example, absolutely must be installed and updated frequently if an enterprise's network and computing infrastructure is to remain up-and-running. Unfortunately, the content filtering of inbound email and other Internet communication is a costly, and often ineffective approach toward protection from network pollutants.

One problem related to email pollutants is the inability to determine the authenticity or the identity of the sender of email messages. Email message "from" addresses are easily spoofed, allowing the sender to masquerade as someone else. The sender can attach harmful malware (e.g., worms, viruses, spyware) to the email message, insert hyperlinks to false web pages (e.g., phishing), or others. The recipient of a spoofed email, believing the email is sent by a trusted acquaintance, may open a malware attachment and unleash a worm or virus into the recipient's system, or enter personal information at a false web page, only to have the recipient's identity stolen by the spoofer.

Filtering inbound email involves attempting to identify email messages with potentially harmful content or attachments. Due to the increasing volume, scope and evolution of email pollutants, the current reliance on content filtering to identify these threats continues to be a costly and technological challenge. Network threats are continually bombarding enterprise networks, and continually adapting to get around the filters that are put in place. Filtering inbound network traffic is a never ending process of upgrading to new filtering mechanisms to ward off new threats. Filtering inbound email is therefore reactionary, whereby enterprises must always be reacting to new variations and evolving threats.

Filters of spam and other email content often generate false positives and filter out "good" email. Content filtering inaccuracies can often disrupt the delivery of a legitimate email message by sidelining, quarantining or halting delivery all together. Additionally, The sender of the legitimate email has no way of knowing whether the email message got to the intended recipient, or was filtered out without delivery. In cases where email "bounces", and non-delivery report is generated, the reason for the non-delivery cannot be easily determined and a businesses IT management has no deliverability reporting of the failed email messages. Additional deliverability concerns arise due in part to the fact that email messages often hop through unreliable store-and-forward gateways in route to their destination.

Another problem relates to a characteristic of public Internet application gateways, in that these gateways must receive whatever email or other data are sent to them. As such, corporate email gateways are susceptible to denial-of-service" (DoS) attacks. DoS attacks can come in different forms, such as flooding, but all DoS attacks are intended to force the victim to reset or consume its resources so that they cannot perform the intended service and/or obstruct communication between the victim and those attempting to communicate with the victim. The combination of spoofed or forged email envelopes of spam messages often produces bounce messages which are sent erroneously to the masqueraded victim. These "bounce attacks" can flood an email gateway, interrupting critical business communication.

The reflection of the technical problems arising from polluted incoming email is the damage to enterprise reputation as a result of polluted outgoing email. Polluted email with an enterprise domain name may be sent intentionally or unintentionally from the enterprise network, thereby damaging the reputation of the enterprise. A "bot" or "Trojan horse" may become resident on a computer within the enterprise and begin spewing out polluted email messages. Alternatively, a user with malicious intent inside the enterprise may send polluted email from the enterprise. Whether intentional or unintentional, pollution emanating from an enterprise network damages the reputation of the enterprise, which in turn can adversely impact community image, sales, web page hits, supplier relationships, and the like. That said, today's enterprise must contain outbound pollution originating from their networks to ensure successful deliverability of their outgoing email.

Additionally, the majority of most business communication sent over email is transported in plain text over the public Internet and sometimes through intermediate third-party gateways. There is no guarantee to either the sender or the recipient that the email will not be intercepted in transit.

It is with respect to the foregoing and other problems that embodiments of the present invention have been made.

SUMMARY

An embodiment of a system includes a processing node configured to send only authorized inbound messages to registered enterprise networks. An authorized message is a message that includes trusted source indicia. Trusted source indicia indicates that the message was sent by one or more of the processing node or an authenticated message transfer node associated with one of the registered enterprise networks. The system may further include an administration node configured to maintain registration of a plurality of message transfer nodes associated with the enterprise networks.

The processing node may further be configured to detect threats in outbound messages sent from the message transfer nodes. The threats can include one or more of threats indicated by behavior-based anomalies and content-related threats. The processing node may further be configured to insert a message identifier into each outbound message. The message identifier may include a hash of one or more attributes of the outbound message. The processing node may be further configured to generate a reputation metric associated with each of the plurality of registered enterprises, wherein the reputation metric is based at least in part on the threats detected in messages sent from the enterprise networks.

The system may further include a hosted domain name system (DNS) server configured to provide authentication data when queried by recipients of the outbound messages. The authentication data provided by the hosted DNS server may include an Internet protocol (IP) address associated with the processing node. The system may further include a DNS server that is referenced by an enterprise network DNS server, whereby recipient authentication inquiries to the enterprise network DNS server are directed to include the hosted DNS server.

In some embodiments of the system, all outbound messages from the enterprise networks are submitted to the processing node. The processing node may be further configured to detect bounced messages that are bounced back to the processing node. The processing node may still further be configured to distinguish authorized bounced messages from unauthorized bounced messages. The processing node may yet further be configured to use a bounce tracking identifier that is applied to each outbound message to determine if a received bounced message was transmitted by the processing node.

In some embodiments of the system, each of the message transfer nodes receives messages within the associated enterprise network in a first protocol and submits the messages to the processing node in a second protocol. The administration node can maintain registration of the plurality of message transfer nodes by performing one or more of authenticating the message transfers nodes; sending software updates to the message transfer nodes; monitoring availability of the message transfer nodes; issuing arbitrary commands to the message transfer nodes; registering the message transfer nodes; or configuring the message transfer nodes. The administration module may authenticate the message transfer node using an authentication certificate.

The processing node may still further be configured to quarantine outbound messages that have associated threats. The processing node may dispose of each message based on an enterprise disposition policy. The disposition policy may be selected from a group consisting of quarantine until release, bounce back to specified enterprise network user, delete without sending, deliver after a specified time, and deliver only after approval.

Embodiments of the system may still further include one or more policies policy associated with an enterprise. One or more of the policies may specify filtering attributes upon which outbound messages are to be filtered. The processing node may still further be configured to filter outbound messages according to the policy. The one or more policies can include one or more of an enterprise-level policy, a group-level policy, a department-level policy, or a user-level policy. The one or more policies can specify a standard stationary to be applied to every outbound message sent from the enterprise network.

The processing node may further be configured to insert one or more identifiers into each outbound message sent from the message transfer nodes. The identifiers may be selected from a group consisting of an integrity checksum signature; a message identifier configured to be used to track the status of the associated message; a bounce tracking identifier; and a domain name authentication identifier.

An embodiment of a method includes receiving outbound messages from an authenticated message transfer node of an enterprise network, screening the messages for threats to determine whether to send the messages to associated recipients, applying a first message identifier to each message, wherein the first message identifier can be used to track the message and, for each message, sending the message to the associated recipient if no threats are detected in the message.

The method may further include filtering the outbound messages according to filter criteria, and for each message, storing the associated message identifier. The method may still further include storing attributes and content filtered from each message such that the attributes and content can be retrieved using the associated message identifier.

Embodiments of the method may further include providing sender authentication information in response to an authentication query that uses the message identifier rather than an original sender identifier. Yet further, the method may include computing a reputation metric based on threats detected in the outbound messages. Computing a reputation metric can include computing one or more of an enterprise-wide reputation metric, a group-wide reputation metric, a user-level reputation metric, a department-level reputation metric, or an office site reputation metric.

Embodiments of the method may further include quarantining messages that include detected threats. The methods may still further include disposing of each quarantined message according to a quarantine disposition policy selected from a group consisting of deleting the quarantined message without delivery after a specified amount of time; delivering the quarantined message after a specified amount of time; delivering the quarantined message only after approval is received from an enterprise network administrator; sending the quarantined message to an identified user within the enterprise network; and sending the quarantined message to the sender of the quarantined message.

The method may further involve identifying an attachment in a selected outbound message, extracting the attachment from the selected message, storing the attachment, and inserting a link into the selected outbound message, whereby the message recipient can access the attachment via the link.

Another embodiment of the method may further involve generating the message identifier by computing a hash of one or more attributes of the message.

Yet another embodiment of the method may involve filtering the messages based on one or more filtering criteria selected from a group consisting of MAIL FROM parameter, message checksum, HELO Strings, headers, total size, number of attachments, total size of attachments, messages with Hypertext Markup Language (HTML), messages with text, message with multiple parts, messages with self-contained images, spam score, source IP address, IP address of client sender, IP address of member message transfer node, and IP address of enterprise server.

Yet another embodiment of the may involve inserting one or more additional identifiers are into each message, wherein the one or more additional identifiers are selected from a group consisting of an integrity checksum signature; a bounce tracking identifier; a domain name authentication identifier.

Yet another embodiment of the method involves detecting a message that is bounced without reaching the associated recipient by determining that the message contains a bounce tracking identifier. The method may further include verifying whether a received message is an authorized message or an unauthorized message by determining whether a bounce tracking identifier is present in the received message.

In yet another embodiment, the method includes screening the messages by determining whether the messages include one or more content-related threats or whether the messages are indicative of a behavior-based anomaly. The content-related threats may be selected from a group consisting of spam; viruses; spyware; and worms. The behavior-based anomaly may indicate that a bot is resident on an identified node in the enterprise network. When a bot is present on a node the method may involve quarantining all messages sent from the identified node within the enterprise network, while allowing outbound messages from other nodes within the enterprise to be sent to the message recipients.

Another embodiment of a system includes means for registering a plurality of message transfer nodes with a private network, wherein the message transfer nodes reside in associated enterprise networks that are members of the private network; means for determining whether inbound messages sent to the enterprise networks have associated trusted source indicia; and means for transmitting only inbound messages that have associated trusted source indicia to the enterprise networks.

A more complete understanding of various embodiments and features of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
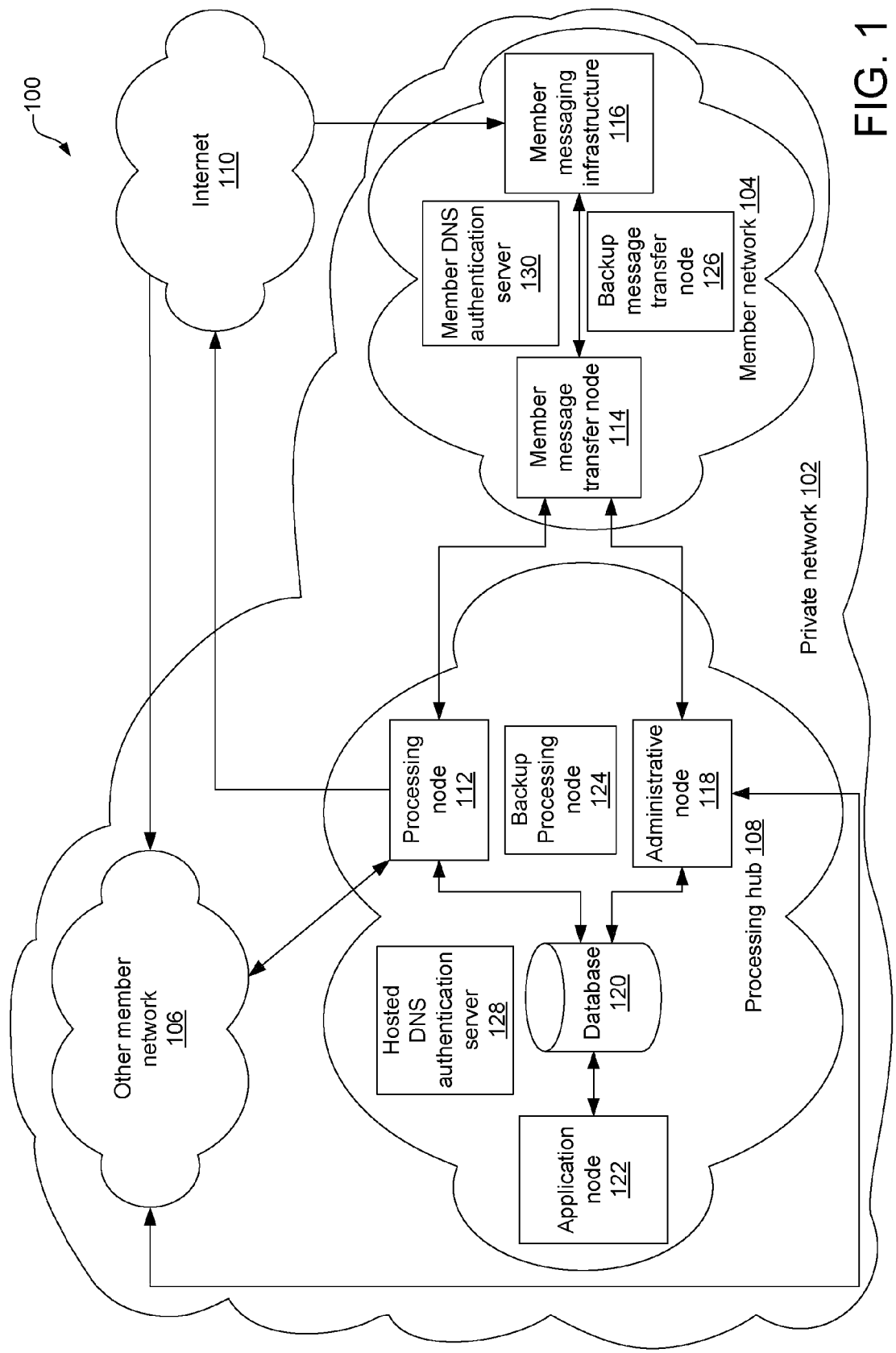
FIG. 1 illustrates an exemplary operating environment including a private network in which a private network processing hub provides various message-related services to members to ensure private network integrity and manage member reputation.

Systems and methods are described below that overcome problems and shortcomings associated with conventional inbound message filtering, by proactively filtering outbound message traffic in a private network. In addition to outbound message filtering, the private network can provide other outbound message services to one or more member nodes and networks that are registered with the private network. Messages emanating from the members are submitted through a private network processing hub, where various processes are carried out with respect to the messages to preserve the integrity of the network and enhance members' trustworthiness as perceived by nonmembers. Among other processing, the messages may be filtered by the processing hub according to filtering attributes, and/or quarantined when a threat is detected. If quarantined, a message may be disposed of according to a delivery disposition policy. As such, the private network reduces or eliminates threats from messages emanating from the member networks, thereby improving member reputation.

In various embodiments, the processing hub can substantially ensure that threats will not be present in messages from member networks. The processing hub may create a signature or hash message ID for each message submitted or delivered through it, indicating that the message has been prescreened for threats and originated from a vetted legitimate member. As such, recipients of member messages can trust that the member messages are safe, have not been tampered with, and are authenticated to have originated from the claimed sender. Recipient non-member enterprises may "white list" members of the private network as a result of enhanced member trust. Alternatively, or in addition, nonmember recipients may become members to reap benefits of the services provided by the processing hub. In one scenario, a nonmember may become a member of the private network in response to an invitation, which may be from a current member or from the private network on behalf of a member.

According to some embodiments, the processing hub provides guaranteed message delivery between members. In part because of proactive filtering of outbound messages from members by the processing hub, members do not need to worry that messages from other members pose a threat. As such, messages from members to other members have substantially reduced risk, compared to conventional filtering, that a "false positive" will result in incorrectly filtering out good inbound messages. Although members may still have inbound filtering functionality to filter inbound message traffic from public networks, members of the private community will not need to worry about the filtration of inbound messaging from the processing hub.

Various embodiments of the processing hub prevent message pollution and threats from entering the private network and/or member networks. In these embodiments, the processing hub does not provide an open interface to accept unauthorized messages from publicly accessible networks, such as the Internet, for delivery to members. Embodiments of the processing hub do not deliver commercial marketing messages.

In some embodiments, the processing hub tracks member outbound message statistics. For example, the processing hub may track the number of bounced messages, number of threats detected, types of threats detected, source nodes of messages, intended recipients, attachment frequencies/types/sizes, and/or number of messages received from each of the other members. An audit report can be generated that is accessible to an administrator of each respective member network. The audit report can be accessed by the administrator through a web portal.

In various embodiments, policies may be specified for each member. The policies may be applied at the enterprise level, group level, division level, department level, office level, individual user member, or others. Member network administrators can create and modify policies through a web portal. Policies may specify allowed or disallowed member Internet protocol (IP) addresses which may submit traffic to the member message transfer node, allowed message domain names contained in the email envelope, group-level or user-level filtering rules, and others. Members may configure message filtering policies to be performed based on one or more criteria, such as, but not limited to, attachment types, sizes and frequencies and message content, member reputation, sender, recipient, and a combination of sender and recipient.

One or more embodiments of the processing hub provide reputation management services. Reputation management can be in the form of active or passive and immediate or long-term practices. By way of example, but not limitation, message threats can be immediately filtered when detected during submission and outbound message statistics can be monitored to facilitate determination of ways to improve reputation, threats can be proactively detected and quarantined, and members can be penalized or rewarded based on a threat-based reputation metric.

According to some embodiments of an architecture including a processing hub, one or more member message transfer nodes are deployed in the demilitarized zone (DMZ) or on the Internet edge within each member network. Each member message transfer node is registered with the processing hub and the member node is configured according to the member policy. The member node securely communicates messages outbound from the member network to the processing hub. The member node can communicate in a first protocol internally to the member network and communicate in another protocol externally to the processing hub. By way of example, but without limitation, messages can be sent to the member node from within the member network using Simple Mail Transport Protocol (SMTP) and submitted by the member node to the processing hub using Extensible Markup Language (XML). Other message submission protocols can be used. In these embodiments, message spoofing is prevented in messages that are outbound from member networks.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed therebetween, while not sharing any physical connection on with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "responsive" includes completely or partially responsive.

The term "end user" refers to a user of a computing device or other type of node within a network. Typically an enterprise has multiple end users. In various embodiments described herein, a policy can specify user-level policies, which are policies that apply to individual end users at the enterprise.

The term "member" refers to an entity that is registered with a private network. Members receive services provided by the private network processing hub. In embodiments described herein members are typically enterprises that register with a private network.

The term "enterprise" refers to a for-profit or not-for-profit organization. By way of example, but not limitation, enterprises include government organizations, companies, joint ventures, small businesses, and universities.

The term "member network" refers to a network owned, deployed, and/or maintained by a member. Member networks, can be, without limitation, local area networks (LANs) and wide area networks (WANs).

The term "member message transfer node" or "member node" refers to a node deployed in the member's network that is configured to interact with a private network processing hub. This interaction includes, without limitation, submitting messages from the member network to the processing hub, and responding to commands from the processing hub. Message transfer nodes can be a hardware appliance, a software gateway, or one or more components (e.g., server) in the member's preconfigured messaging (e.g., email) infrastructure.

The term "nonmember" refers to an entity that is not registered with a private network. Nonmembers typically do not directly receive services provided by the private network, but are typically beneficiaries of services provided by the private network to the members.

The term "nonmember network" refers to a network owned, deployed, and/or maintained by a nonmember.

The term "private network" refers to a group of one or more member networks that utilize services of a private network processing hub. Typically, a private network will include multiple member networks and multiple processing hubs. The multiple member networks and processing hubs are typically geographically distributed.

The term "private network hub" or "private network processing hub" refers to a networked center for receiving and processing outbound member network messages, and routing only authorized messages received from public networks to the associated member network if the member has specified that such messages should be routed to the member network. Processing of member network messages can include one or more of message filtering, message tracking, threat detection, bounce management, or message signing.

The term "authorized message" refers to a message that includes trusted source indicia. In various embodiments, messages received by the private network hub are analyzed to determine if they include trusted source indicia to determine whether the messages should be transmitted to member networks. Trusted source indicia can include, but is not limited to, a recognized identifier in the message that is associated with a trusted source, a trusted communication path or port from which the message is received, or an authenticated node that submitted the message.

The term "outbound" refers to a logical direction of data flow, wherein the data flow is from, or out of, a node or a network. In embodiments described herein, outbound data flows from one or more member networks through a private network enroute to a recipient, regardless of whether the recipient is another member or a nonmember.

The term "inbound" refers to a logical direction of data flow, wherein data flow is toward, or into, a node or a network. In embodiments described herein, inbound data flows from a private network into a member network.

The term "node" refers to any logical addressable point in a network. Nodes are typically uniquely addressable, but can have multiple addresses (e.g., IP addresses) associated with it. By way of example, but not limitation, desktop and portable computers, server computers, gateways, routers, gatekeepers, appliances, telephones, and terminal adaptors are all types of nodes.

The term "reputation" refers to the general opinion or beliefs that are held about an entity. In embodiments described herein, a member's reputation can be influenced by characteristics of the member's outbound message traffic. These characteristics can be, without limitation, content and/or behavior. As such, some embodiments attempt to manage reputation by observing member outbound message traffic and providing reputation management services, based on the observations.

The term "reputation management" refers to controlling or administering reputation. In some embodiments, reputation management is carried out or facilitated by observing member outbound message traffic, identifying outbound message traffic characteristics that correspond to predetermined characteristics of interest, and implementing a reputation-directed response to identification of the characteristics of interest in the outbound message traffic.

The term "message" refers to a set of one or more units of data, which when combined form a logical whole unit that has an associated sender and an associated intended recipient. In some embodiments messages are electronic mail (email) messages; but the invention is not limited to email messages. Rather, the invention could be applied to other types of messages, such as, but not limited to, online chat messages (e.g., instant messages) or text messaging. For purposes of illustration, various embodiments are described with reference to email messages in the Simple Mail Transport Protocol (SMTP).

The term "pollution" or "message pollution" refers to data in a network that decreases the usefulness of a resource in some way. By way of example, but not limitation, pollution includes spam, spyware, viruses, any other type of malware, phishing messages, spoofed messages. "Bots" and "botnets" are significant sources of pollution.

The term "bot" refers to any type of software that operates autonomously as an agent of a user or another node or program. A "botnet" is a group of bots in a network. Nodes can be infected with bots.

The term "behavior-based anomaly" refers to behavior or manner of operation of a node or network that deviates from an expected behavior or manner of operation. In accordance with embodiments described herein, behavior-based anomalies can be used to detect a change in behavior of a node or network that could indicate that the node or network has been systemically altered with a bot or other long-term pollution source. As such, behavior-based anomalies are indicative of systemic or ongoing sources of pollution.

FIG. 1 illustrates an exemplary operating environment 100 including a private network 102 in which a member network 104 and other member network(s) 106 register with a processing hub 108. The processing hub 108 provides message-related services and/or other services to members of the private network 102. Message-related services are any services that are related to messages outbound from, or inbound to, a member. Reputation management services can be message-related because reputation can be affected as a result of information learned about outbound messages, steps taken to prevent delivery of threatening messages, and/or steps taken to enhance perceived trustworthiness of outbound messages. Message-related services can also include message routing, tracking, filtering, signing, certification, bounce management, disclosure statements, stationary application, and others.

Outbound message traffic from the member network 104 passes through the processing hub 108 enroute to recipients, such as recipients within the other member network 106 or a public network, such as the Internet 110. The other member network 106 includes components and/or infrastructure similar to those shown in the member network 104. Each of the networks can be wireless or wired or a combination thereof. Any of the illustrated networks may be made up of multiple sub-networks, and may be geographically distributed. For example, the Internet 110 could include ISP backbones or autonomous systems (AS). The private network 102 may have peering relationships with sub-networks in the Internet 110.

Messages flow between the processing hub 108 and the member network 104 via message transfer agents (MTA) of one or more processing nodes 112 and a member message transfer node 114. Within the member network 104, a member messaging infrastructure 116 handles messages inbound from the public network, as well as messages outbound from the member network 104. The member messaging infrastructure 116 directs messages outbound from the member network 104 to the member node 114, which send them to the processing hub 108. As such, all messages sent out of the member network 104 go through, and are processed by, the processing hub 108.

The member message transfer node 114 is administered by an administrative node 118 in the processing hub 108. Administration of the member message transfer node 114 can involve provisioning, configuration, monitoring, and software upgrading, among others. The member message transfer node 114 can optionally include certain pre-processing functions (such as part of the functions performed by the processing node 112 below).

The processing node 112 performs various services related to messages outbound from the member network 104 and the other member network(s) 106. These services include outbound message filtering. By filtering outbound member messages, member recipients can be assured that their inbound messages from other members do not pose a threat. Message traffic services provided by the processing node 112 can also include, without limitation, message tracking, quarantining, queuing, routing, message signing, bounce management, and reputation management. Services provided by the processing node 112 are discussed in more detail below.

One or more databases 120 store data related to members and message traffic. For example, a database 120 can include policies that specify member policies, group level policies, or end-user policies. Policies can set forth, for example, the types of filtering, allowed message IP addresses, allowed domain names, criteria to be tracked, and other rules. The database 120 can also include tracking data related to member outbound messages. Still further, the database 120 may include member billing information. A particular embodiment of the database 120 is discussed in more detail below.

One or more application nodes 122 enable user and computer access to data in the database 120. A network administrator of the member network 104 can use network accessible applications at the application node 122 to view tracking data and reports, as well as to view and update policies, billing, and provisioning related to the member network 104. A particular embodiment of an application node 122 is described further below.

Processing node(s) 112 monitor the outbound message traffic and provide various services that can enhance the perception of trustworthiness and reputation by recipients on the other member network 106 and recipients on the Internet 110. Within the member community that include the member network 104 and the other member network 106, messages from other members can be trusted as a result of processing performed by the processing node(s) 112. In addition, the processing node(s) 112 can apply signatures to outbound messages, whereby recipients on the public network 108 can more readily trust that the messages do not pose a threat because of outbound filtering performed by the processing node(s) 112.

By contrast, messages received by the member network 104 and the other member network 106 from the Internet 110 cannot necessarily be trusted because it is not known or readily verifiable whether messages from the Internet 110 have been filtered for threats.

According to some embodiments, one or more backup processing nodes 124 are included in the processing hub 108, and one or more backup message transfer nodes 126 are included in the member network 104. Backup processing nodes 124 and backup message transfer nodes 126 provide redundancy in case a primary processing node 112 or a primary member message transfer node 114 become unavailable. For example, if the processing node 112 goes offline, a backup processing node 124 will take its place in receiving, processing, and routing messages to and from the member message transfer node 114. Similarly, a backup message transfer node 126 will perform the functions of the member message transfer node 114 if the member message transfer node 114 becomes unavailable.

In one embodiment, the backup message transfer node 126 is an authenticated SMTP server. If the administrative node 118 determines that the member message transfer node 114 is unavailable, the processing node 112 can identify the member's SMTP server in a number of different ways, for purposes of routing inbound mail to the member network 104. In one embodiment, IP address of the backup message transfer node 126 may be specified in the member's policy. In another embodiment, the processing node 112 can lookup the public MX record for the member network 104 to determine where to submit inbound messages.

In accordance with various embodiments, the processing hub 108 is geographically distributed with multiple processing nodes 112 in different geographic locations, proximate to the member networks. In other embodiments, the private network 102 includes multiple geographically distributed processing hubs 108 and each processing hub 108 includes one or more processing nodes 112. In these embodiments, messages can be routed via the processing nodes 112 from one geographic location to another for delivery to the recipient. Routing to processing nodes 112 can be performed in such a way as to meet specified delivery or routing criteria. Routing criteria could include least cost routing, load balancing, proximity-based, or others. In proximity-based routing, a message will be routed to a processing node that is closest to the recipient before the message is transmitted onto the recipient's network, or a public network, if the recipient is a nonmember.

In the illustrated embodiment, the private network processing hub 108 includes a private network hosted DNS server 128 to enable third party authentication of message originators. The hosted DNS server 128 supports Sender Policy Framework (SPF), SenderID, Domain Key Internet Mail (DKIM), or some other sender authentication scheme so that recipients of messages from members can authenticate the originating senders through the private network. In addition, using bio-mark techniques described in U.S. patent application Ser. No. 11/372,970, filed on Mar. 10, 2006, entitled "Marking Electronic Messages to Indicate Human Origination", the message recipient can identify whether the person sending the message is the indicated sender or a human originating sender.

The member network 104 includes a member DNS server 130 that supports sender authentication, such as SPF, SenderID or DKIM. Because messages from the member network 104 are sent by the processing hub 108, in some embodiments, the DNS server 130 lists a processing hub message transfer agent (MTA) IP address as a valid sending IP address.

In other embodiments, in accordance with the inclusion parameter of the SPF or SenderID specification, the DNS server 130 references the processing hub DNS server 128 to be queried in addition to the DNS server 130. In this approach, the recipient who is trying to validate the origin of the message will first perform an SPF or SenderID inquiry to the member DNS server 130. The message recipient obtains the IP address of the DNS server 128 from the member DNS server 130, and inquires to the processing hub DNS server 128 as to authenticity of the sender. The DNS server 128 will return the IP address of the processing hub 108 MTA. As such, the member does not need to keep track of its SPF or SenderID records, but rather the processing hub DNS server 128 manages the member's SPF or SenderID records for the member.

In yet another embodiment, the member can configure a subdomain within the member's main domain, wherein the processing hub DNS server 128 hosts SPF or SenderID records for the subdomain. When a message is submitted to the processing hub from a member node, the sender envelope (e.g., MAIL FROM) is rewritten using the user name and a message ID hash that represents the subdomain. When the recipient queries the SPF record to authenticate the sender, the processing hub 108 can track authentication requests for a specific message. The processing node 112 can track authentication requests for specific sender envelope addresses. In addition, "out-of-band" authentication requests can be identified, in order to detect if spoofing is occurring.

In accordance with various embodiments, the interconnections between one or more member networks and the processing hub 108 can be public lines. In addition, private leased lines can be used to connect member nodes to the private network processing hub 108. In this regard, it will be understood that the private network 102 is logically a private network, even if certain interconnections make use of public infrastructure.

Figure 3:
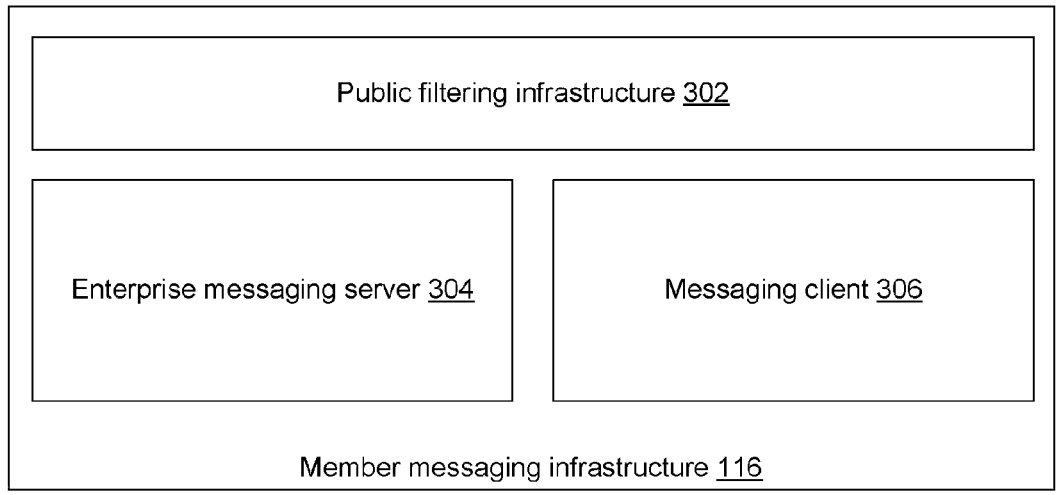
FIG. 3 illustrates functional components of an exemplary architecture of the member messaging infrastructure shown in the operating environment of FIG. 1 in accordance with one embodiment.

With more specific regard to the member network 104, the member messaging infrastructure 116 and the member message transfer node 114 handle inbound and outbound messages to and from the member network 104. With reference to FIG. 3, the member messaging infrastructure 116 typically includes a public filtering infrastructure 302 (FIG. 3), an enterprise messaging server 304, and a messaging client 306. The enterprise messaging server 304 includes one or more server computers that manage messages within the member network 104. In some embodiments, the enterprise messaging server 304 includes a Microsoft™ Exchange Server, a post office protocol (POP) server, and/or a simple mail transport protocol (SMTP) server.

The filtering infrastructure 302 can include, without limitation, conventional spam filter tools and virus filter tools to prevent malware and pollution from entering the member network 104 via inbound messages. Because inbound messages from the processing node 112 (or backup processing node 124) are trusted, the filtering infrastructure 302 does not need to, and typically will not, filter messages inbound from the processing node 112. Typically, only messages inbound from the public network 110 are filtered by the filtering infrastructure 302. The load on the filtering infrastructure 302 can therefore be reduced by the proportion of traffic load from other member networks 106.

The messaging client 306 communicates with the member message transfer node 114 to direct all outbound messages from the member network 104 through the member message transfer node 114. In one embodiment, the member message transfer node 114 sets up a secure link between an outbound submission service 202 (FIG. 2) and a message transfer agent (MTA) 508 (FIG. 5) of the processing node 112. In one embodiment, the secure link is a Secure Sockets Layer/Transport Layer Security (SSL/TLS) link between the member network 104 and the processing hub 108.

Figure 5:
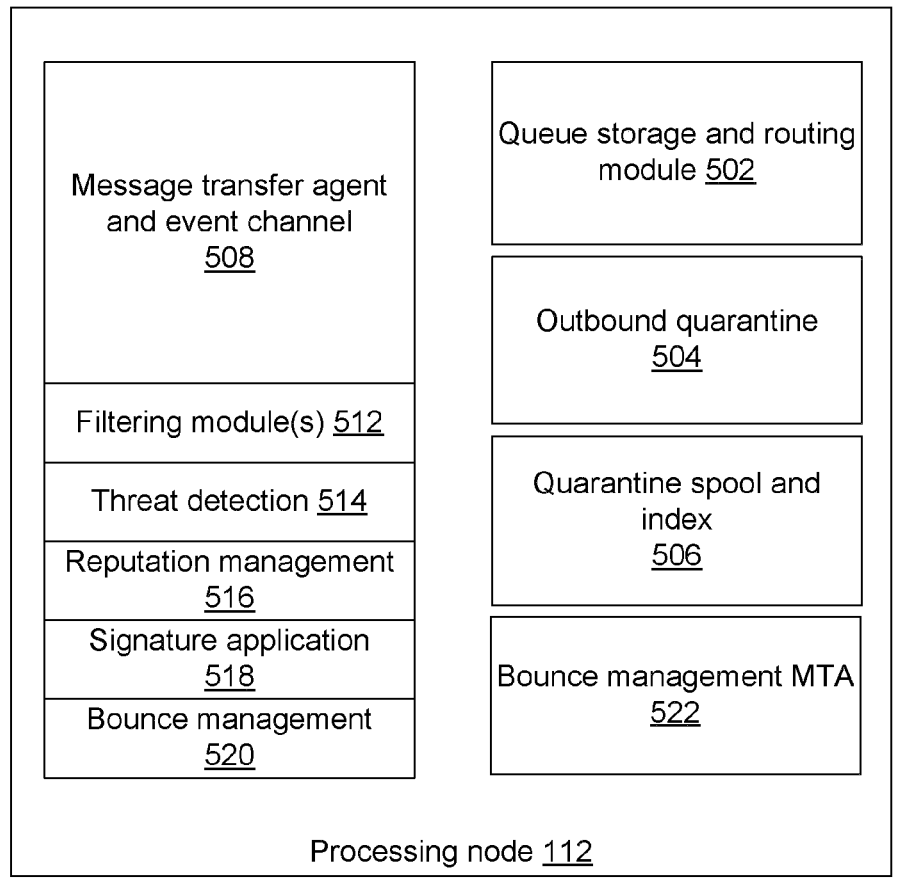
FIG. 5 illustrates functional components of an exemplary processing node shown in FIG. 1 in accordance with one embodiment.

With more specific reference to FIG. 5, embodiments of the processing node 112 can include one or more queue storage and routing modules 502, an outbound quarantine 504, and a quarantine spool and index 506. Backup processing nodes 124 include components similar to those shown in FIG. 5, so that backup processing nodes 124 can perform message processing in the same manner as the primary processing node 112.

MTAs 508 handle receipt of messages submitted to the processing hub 108 from member networks and delivery of messages out of the processing hub 108. MTAs 508 include an event channel that applies filtering rules to the message traffic to detect threats and facilitate management of members' reputation. In this regard, the MTAs 508 and event channel include, for example, one or more filtering modules 512, threat detection modules 514, reputation management modules 516, signature application modules 518, and bounce management modules 520.

Filtering modules 512 filter messages based on filtering policies set forth in members' policies. Some exemplary criteria upon which messages can be filtered are, without limitation: message content, attachments, sender, recipient, combination of sender and recipient, reputation, spam, and viruses. For example, with regard to filtering on content, filtering can involve searching message content (e.g., text) for specified words, phrases, patterns, etc. As another example, filtering could involve identifying any messages with attachments, or messages with more than a certain number of attachments, or certain types of attachments (e.g., graphics, photos, audio, text, etc.).

Threat detection modules 514 detect threats posed by messages. Threats can include, without limitation, bots, botnets, spam, viruses, spyware, adware or other malware. Bots and botnets can pose a significant threat because they indicate that a node on the network has been taken over by malicious code and is being controlled to send threatening messages. As such, particular action may be taken to stop botnet activity. For example, when a bot is detected, the MTA nodes 508 can selectively prevent delivery of all messages being sent from the bot. Advantageously, messages from a bot on a network can be stopped, without stopping delivery of other nonthreatening messages being sent from the network.

Threats detected in messages are filtered out within the processing hub 108 to ensure private network integrity and enhance member to private network trust. In this regard, viruses, worms, and other threats are filtered out at the processing hub 108.

In one embodiment, the threat detection module 514 computes a spam score for each message. The spam score indicates the likelihood that the message is spam. The spam score can be computed using heuristic tests or other analyses. The spam scores can be tracked and stored, and can be used as a message attribute upon which messages are filtered.

Detected threats, among other criteria, can be used by the reputation management module 516 to compute a measure of reputation, such as a reputation score associated with the members. The reputation measure is representative of a member's reputation. The reputation measure can be used in a number of ways and for a number of purposes. In accordance with one embodiment, there are two contexts in which reputation measures may be used: to identify an immediate message action and to establish long-term member or end-user actions.

With respect to immediate message action, the filter module 512 can immediately filter out a single message based on the sender's reputation score, and some action (e.g., deny, blind carbon copy (bcc), etc.) can be taken on the single message. As another example, if reputation falls below a specified threshold level, the member may be penalized. Alternatively, if the reputation reaches or stays above a specified upper threshold, the member may be rewarded. As such, numerous reputation recognition and feedback mechanisms can be used.

When a threat is detected in a message, the threatening message may be quarantined in the outbound quarantine 504. The outbound quarantine 504 holds messages until they are disposed of in accordance with the members' quarantine policies. In some cases, the messages are held for further inspection, for example, by a network administrator. Upon further inspection, it may be determined that a quarantined message does not actually pose a threat, and may then be transmitted to the intended recipient. If, after further inspection, it is determined that the message does pose a threat, the network administrator can take further action, such as identifying, fixing, and/or removing the node from which the message was sent. Other dispositions may be applied to quarantined messages. For example, the quarantine 504 may keep messages indefinitely, or for a specified amount of time, after which the messages are deleted.

The quarantine spool and index 506 keeps track of messages in the outbound quarantine 504. When the messages entered the quarantine 504 and/or the order of disposition of messages in the quarantine 504 are tracked by the quarantine spool and index 506. In some cases, messages in the quarantine will be delivered to the original recipient or back to the sender, or another user specified in the member policy. In these cases, the quarantined messages are routed by the queue storage and routing module 502.

Referring to the signature application module 518, a unique message identifier or marker can be applied to each message. In one embodiment, the message ID is a hash ID, which is created and inserted into the message. The hash ID may be inserted into a header of the message. The message ID will indicate to the message recipient that the message was prescreened and originated from a legitimate member of the private network. All the message IDs are saved in the database 120, and can be used to track the messages. For example, using a message ID, queries can be made about attributes and disposition of the corresponding message. Message IDs can be used by a message recipient to authenticate the sender of the message. As discussed at other points herein, sender authentication can be carried out using DNS SPF, SenderID, DKIM, or other authentication mechanisms. In addition, message IDs are used in message bounce management.

In order to maintain a pollution free environment in the private network, the private network processing hub 108 will not receive unauthorized messages from the public Internet. However, one exception to this relates to bounce management. Various embodiments of the private network processing hub 108 include a bounce management MTA 522 that is open to the public in order to receive bounce messages that originate from the processing hub 108. In one embodiment, a bounce management module 520 analyzes received bounce messages for tracking purposes and to distinguish authorized bounces from unauthorized bounces.

Figure 7:
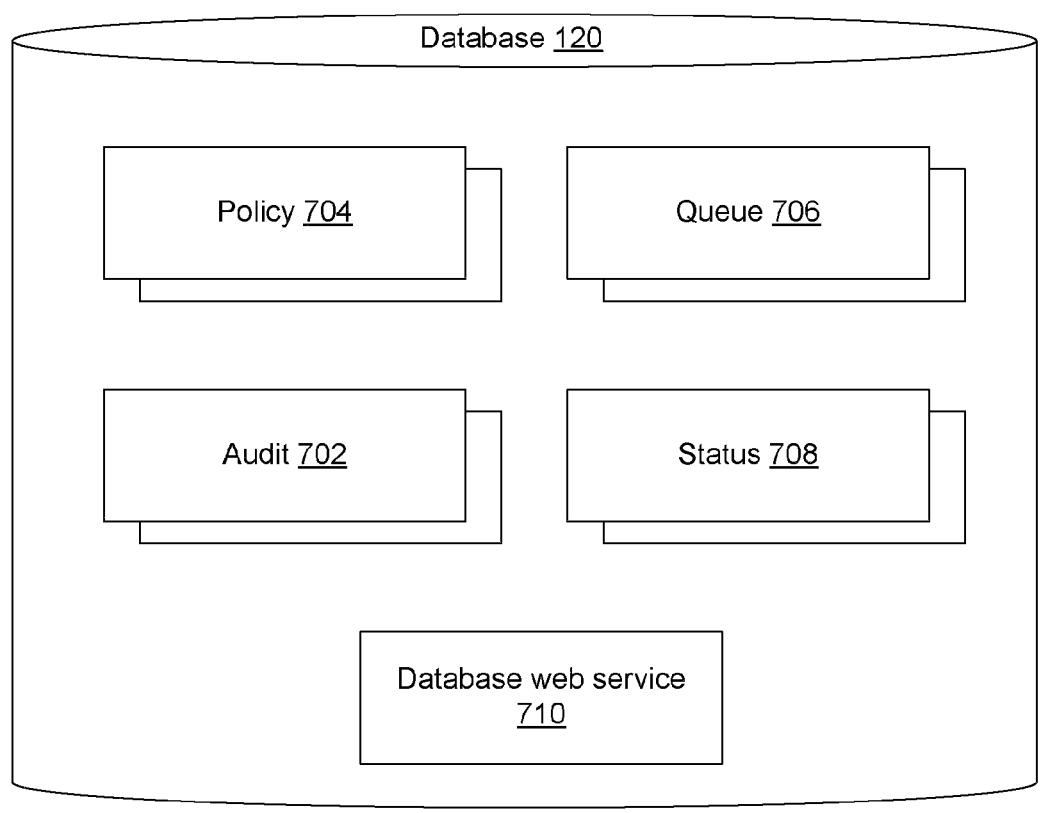
FIG. 7 illustrates components of an exemplary database including member and outbound message-related data which may be employed in the environment of FIG. 1 in accordance with one embodiment.

In one embodiment, the Variable Envelope Return Path (VERP) technique is used. Before the MTA 508 sends an outbound message, the signature application module 518 replaces the original envelope sender address with a hash ID. To illustrate, if the hash ID is ABCDEF12345, then "member_user1@member.com" can be replaced with "ABCDEF12345@privatenet.com". If the message bounces back, the bounce management module 520 can determine that the message originated from the processing hub 108. In this regard, messages inbound to the private network processing hub 108 from the Internet 110 are considered to be authorized messages if they include a recognized hash ID in the sender name section of the bounced message. Messages received from the Internet 110 that do not have a recognized hash ID in the sender name section are not authorized and the processing hub 108 will prevent those unauthorized messages from entering member networks. In addition, the bounce management module 520 can use the hash ID (ABCDEF12345) to look up specific information (e.g., in the audit database 702 (FIG. 7)) about the message and track the message as a bounce. Bounce messages from both members and nonmembers can be tracked.

The bounce management module 520 uses the member's bounce policy to determine the appropriate disposition of the bounce message. Various options may be available for the member to choose from. For example, bounce messages could be bounced back to the original sender, or not bounced back to the original sender. Bounce messages could be submitted to a specified bounce MTA within the member network. One benefit of the bounce management module 520 is insulation of the member networks from bounce messages and spam that poses as bounce messages. The bounce management module 520 can identify spam posing as a bounced message if the sender envelope includes a nonexistent or invalid hash ID. If the bounce management module 520 determines that a bounce attack or flood is occurring, remedial action can be taken to prevent harm to the processing hub 108. In addition, handling of bounced messages is delegated to the processing hub 108 and carried out according to the member policy.

Figure 6:
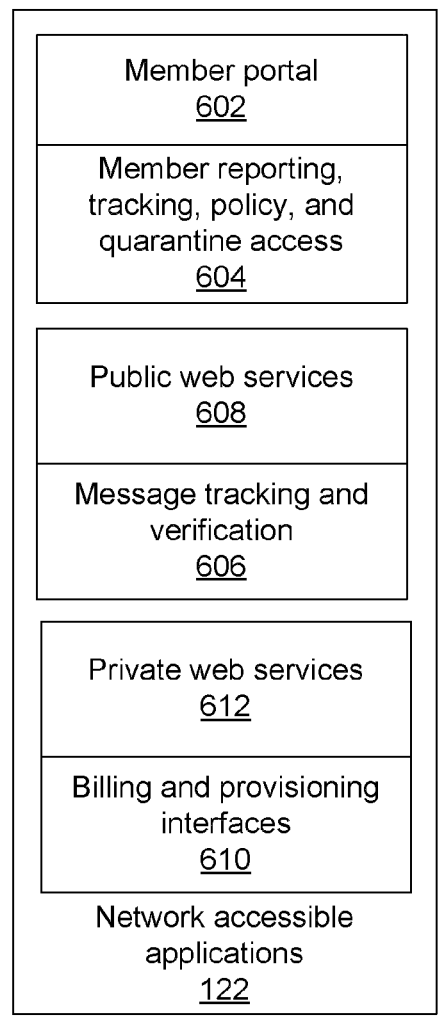
FIG. 6 illustrates functional components of an exemplary application node shown in FIG. 1 in accordance with one embodiment.

Data gathered by the MTA nodes and event channels 508 can be logged in audit reports 702 (FIG. 7) of the database 120. Administrators of the member network 104 can access the audit reports through a member web portal 602 (FIG. 6). The administrator can build and/or access audit reports 702 through member access module 604 via the web portal 604.

Message tracking performed through the member portal can include tracking one or more statistics associated with outbound messages. The statistics may include one or more of:
    the total number of messages;
    the total number of messages suspected of being spam;
    the total number of messages suspected of containing a virus;
    the average number of messages originated;
    the average number of messages originated within a predefined time interval;
    the average size of messages originated;
    the largest size message originated;
    the maximum size permitted to be originated;
    the average number of recipients to which messages originated are addressed;
    the largest number of recipients on a particular message originated;
    the maximum number of recipients permitted to be addressed on an outbound message;
    the frequency of recipients;
    the address format (e.g., pretty name) employed;
    the average number of message header lines in messages originated;
    the maximum number of message header lines in messages originated;

the average Bayesian spam filter probability score for messages originated;
the number of messages with attachments;
the number of messages with attachments of certain types or groups of types (e.g., .exe, .com, .sys, .dll, .scr, .cpl, .api, .drv, .bpl, .zip, etc.);
the number of messages sent via a particular mailer;
the number of messages that include content from a particular character set; and
standard deviations relating to the foregoing.

Using the message ID, nonmember MTAs and/or public recipient MTAs that receive member messages can access message tracking and verification module 606 via a public web service 608 to verify that the messages did emanate from the private network 102. Tracking and verification module 606 can be accessed to track the history and/or disposition of message. For example, a user can determine whether a particular message was received by the recipient, bounced, quarantined, included a threat, or other disposition. In addition, if a member has specified in its policy to track authentication queries of that member's outbound messages, the member can use the portal to track Domain Name System (DNS) Sender Policy Framework (SPF), SenderID, DomainKeys Identified Mail (DKIM) or other email authentication queries that have been made on each message.

Member administrator billing and provisioning applications can access billing and provisioning interfaces 610 via private web services 612. Optionally, the Billing Services module 610 works with the audit database 702 to keep track of the billing amount to each member. Such amount can be based on credit or debit calculated from one or more of the following: (i) the number of users served by the member node, (ii) the number of outbound messages to other members, (iii) the number of outbound messages to the public network, (iv) the number of inbound messages, (v) the amount of outbound traffic bandwidth to other members (vi) the amount of outbound traffic bandwidth to the public network, (vii) the amount if inbound traffic bandwidth, (viii) the amount or percentage of bad traffic (messages filtered by system-wide spam/virus policies and members' content policies) submitted, (ix) the duration of the retention period for the quarantined messages, (x) the duration of the retention period for member data stored in the audit database, and (xi) the overall reputation score of the member node; and the associated per unit rates for these quantities.

Referring again to the database 120, policies 704 are stored and can be accessed and edited by the member administrator through the web portal 602. In various embodiments, policies can specify numerous aspects of message processing. By way of example, but not limitation, the administrator could specify the following in the policy:
content and/or attribute filtering,
outage procedures when the member message transfer node fails,
value-added features performed during message processing,
response procedure if a bot is detected,
steps to take for quarantined messages,
bounced message response and disposition actions,
email authentication tracking,
customization of HTML message stationary or templates,
message manipulation prior to sending to recipient.

With regard to content filtering, the administrator could specify that message profanity, pornography, or other undesirable or questionable content be filtered for tracking purposes and/or for quarantining. With regard to attribute filtering, using SMTP to illustrate, the administrator can designate messages be filtered and tracked based on one or more of the following SMTP attributes:
MAIL FROM parameter,
checksum,
HELO Strings,
headers (e.g., RFC 822 headers),
total size,
number of attachments,
total size of attachments,
messages with HTML,
messages with text,
message with multiple parts,
messages with self-contained images,
spam score,
source IP address,
IP address of client sender,
IP address of member message transfer node,
IP address of enterprise server Content and attributes that are filtered out are stored in the audit database in association with corresponding message IDs, where they can be analyzed further. For example, using the message ID discussed above, the administrator can query what content was associated with a particular message and the sender or recipient IP addresses.

With regard to bot response, the administrator may specify in the policy where to send notification of a detected bot, and what action should be taken in response to the bot. Regarding quarantining procedures, the administrator could specify one of various disposition options for quarantined message. Possible dispositions could include automatic message delivery after a designated time period, automatic non-delivery and deletion of the message after a specified time period, keep quarantined until released by the administrator, send the message to a specified member user, or others.

With regard to outage procedures when the member message transfer node fails, or is otherwise unavailable, the administrator can specify redundancy remedies in the policy. Redundancy remedies identify a backup message server that inbound messages should be sent to, and from which messages will be sent. Regarding message manipulation prior to sending, the administrator can specify that certain features be applied to all outbound messages, such as application of a standard enterprise stationary to the messages.

In accordance with one embodiment, when an attachment is filtered, it is extracted from the associated message and stored (e.g., in an attachment vault), and a link to the attachment is inserted into the message prior to sending the message. When the recipient receives the message, the recipient can access the attachment by clicking on the link. As such, attachments, which can often be a source of threats and other pollution will not automatically be delivered to a recipient network and computer.

In some embodiments, through a web portal the member network administrator may specify policies through text/data entry and/or be offered a menu of options to select from. For example, the member can choose to "opt-in" to features or processing provided by the processing hub.

Queuing data 706 and member/message status data 708 are also stored in the database 120. A database web service 710 provides an interface to the database 120 for accessing applications.

Figure 2:
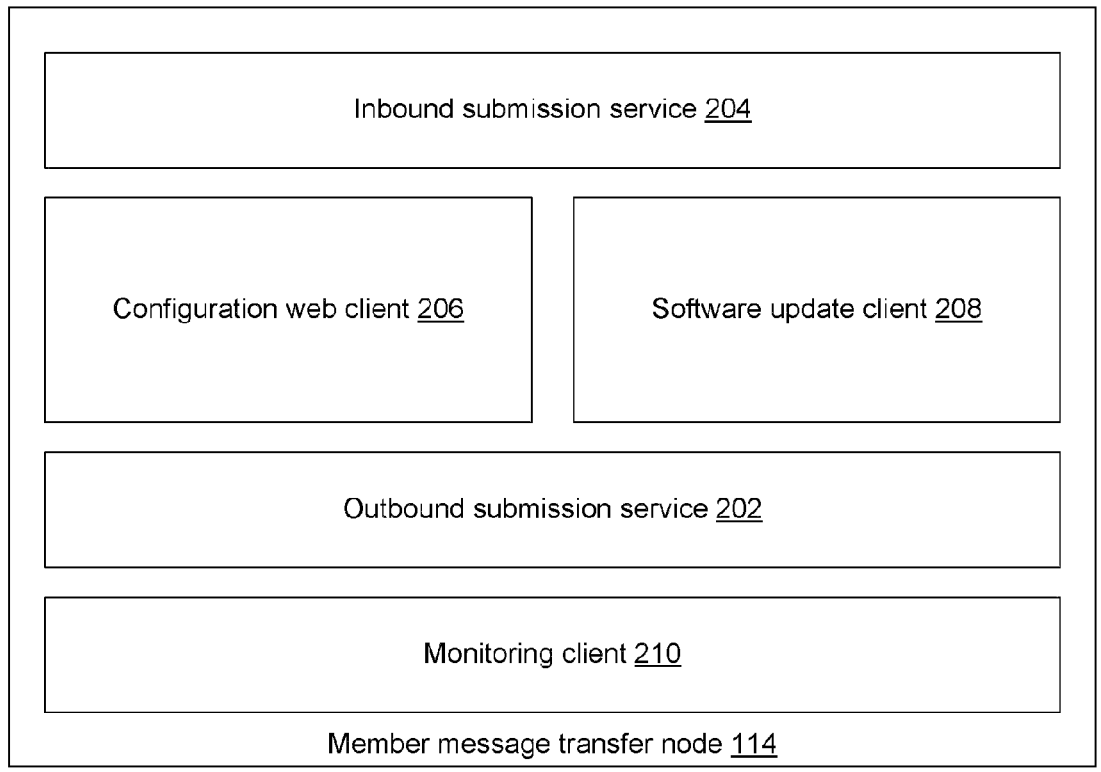
FIG. 2 illustrates functional components of an exemplary architecture of the member message transfer node shown in the operating environment of FIG. 1 in accordance with one embodiment.
Figure 4:
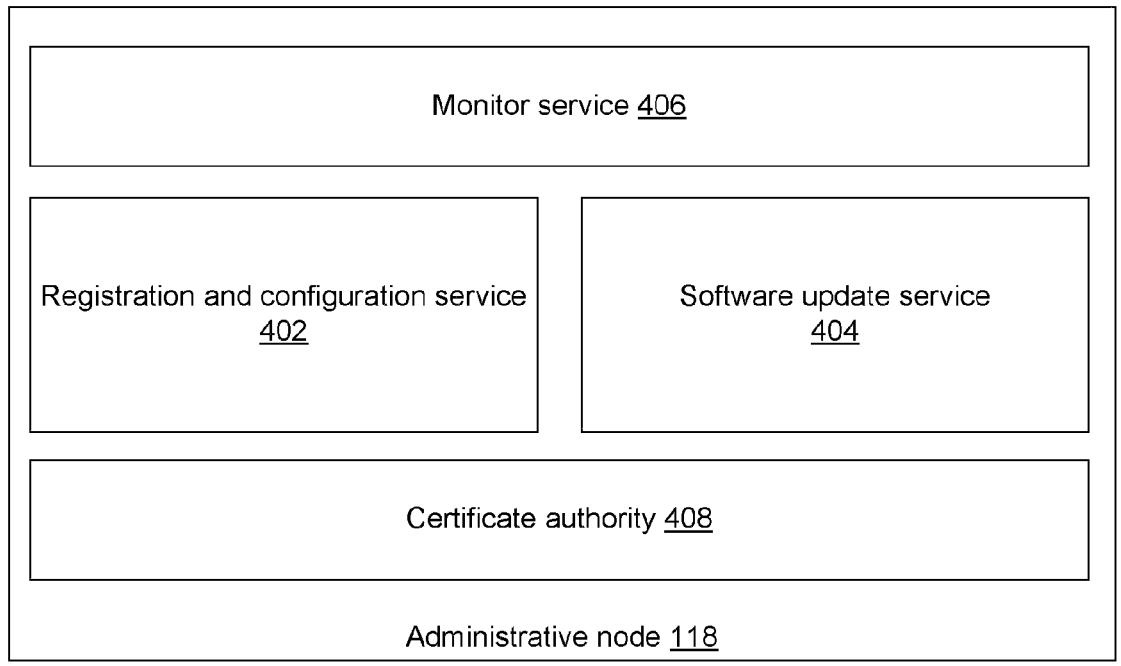
FIG. 4 illustrates functional components of an exemplary administrative node shown in FIG. 1 in accordance with one embodiment.

Referring again to the member message transfer node 114 and FIG. 2, inbound submission service 204 (FIG. 2) receives messages from the private network MTAs 508 and 522. A configuration web client 206 interacts with a registration and configuration service 402 (FIG. 4) of the administrative node 118 to register and receive configure for the member node 114. A software upgrade client 208 interacts with a software update service 404 of the administrative node 118 to receive software updates. A monitoring client 210 communicates with a monitor service 406 of the administrative node 118 to demonstrate that the member node 114 is available. In one embodiment, the member node 114 communicates with the network administrative node 118 via XML RPC. The administrative node 118 also includes a certificate authority 408. The certificate authority 408 issues digital certificates to the member node 114 to facilitate secure communication between the member node 114 and the processing hub 108.

In various embodiments, more than one private network 102 can be operated at the same time by the same provider or different providers. In one such embodiment, the private networks may establish peering agreement(s) among them. In another embodiment, the private networks may each establish a peering agreement with a common gateway instead of peering directly with each other. Such peering agreement(s) may cover honoring of each other's certificate authority, reputation and other filtering policies, thresholds standards, trusted messages display icons, and other technical arrangement, in addition to monetary terms based on quantified traffic data, some examples of which are discussed above with regard to the billing interface 610. Each private network's 102 processing hub 108 includes additional processing node(s) and conduit(s) to accommodate such peering arrangement(s), either peer-to-peer or through peering gateway(s). Peering gateways should have their own processing nodes and other management modules to accommodate such setup of network(s) of private networks.

Exemplary Operations

Figure 12:
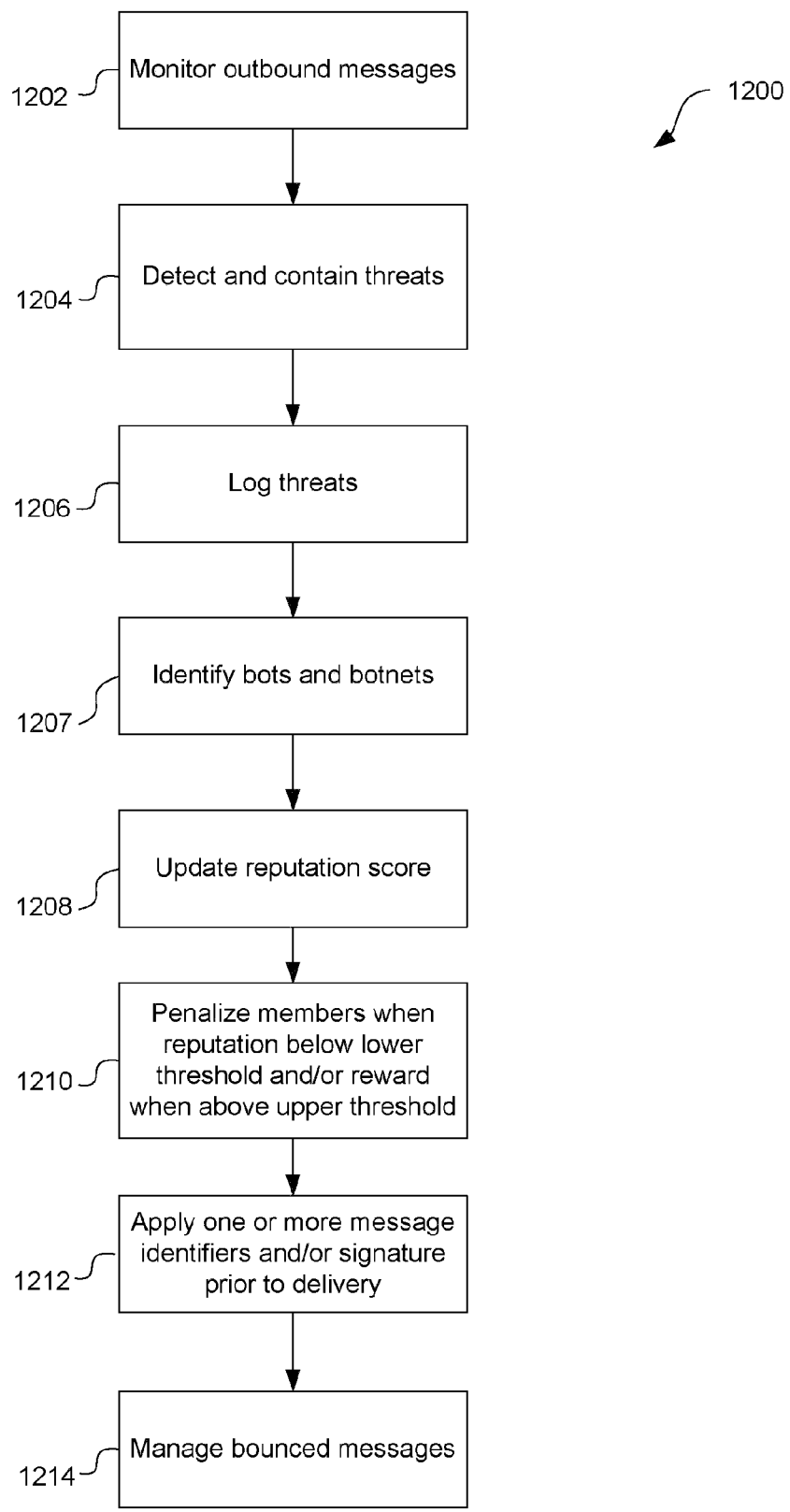
FIG. 12 is a flowchart illustrating a process for managing reputation based at least in part on outbound message monitoring in accordance with one embodiment.
Figure 13:
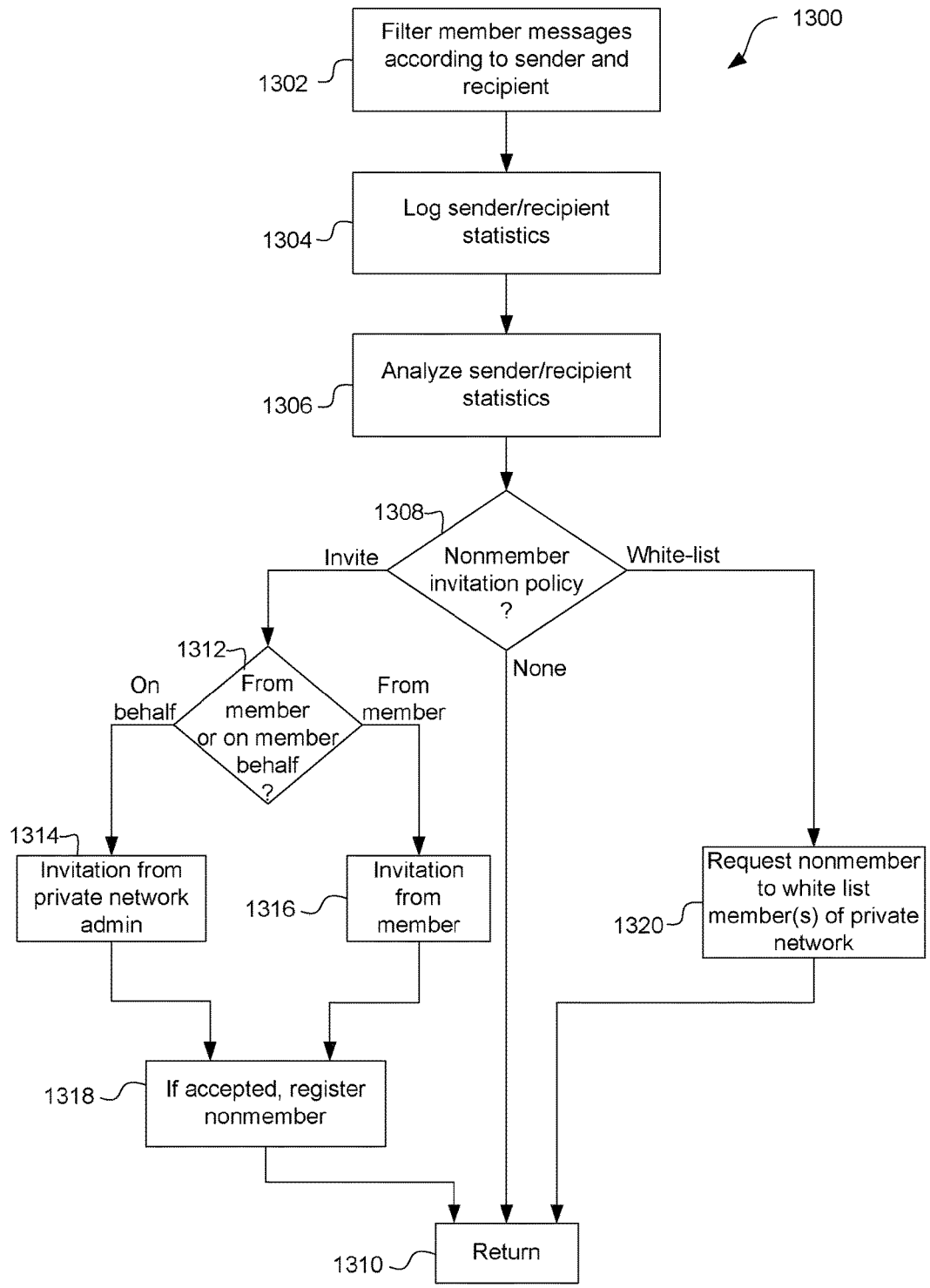
FIG. 13 is a flowchart illustrating a process for relationship management in accordance with one embodiment.
Figure 14:
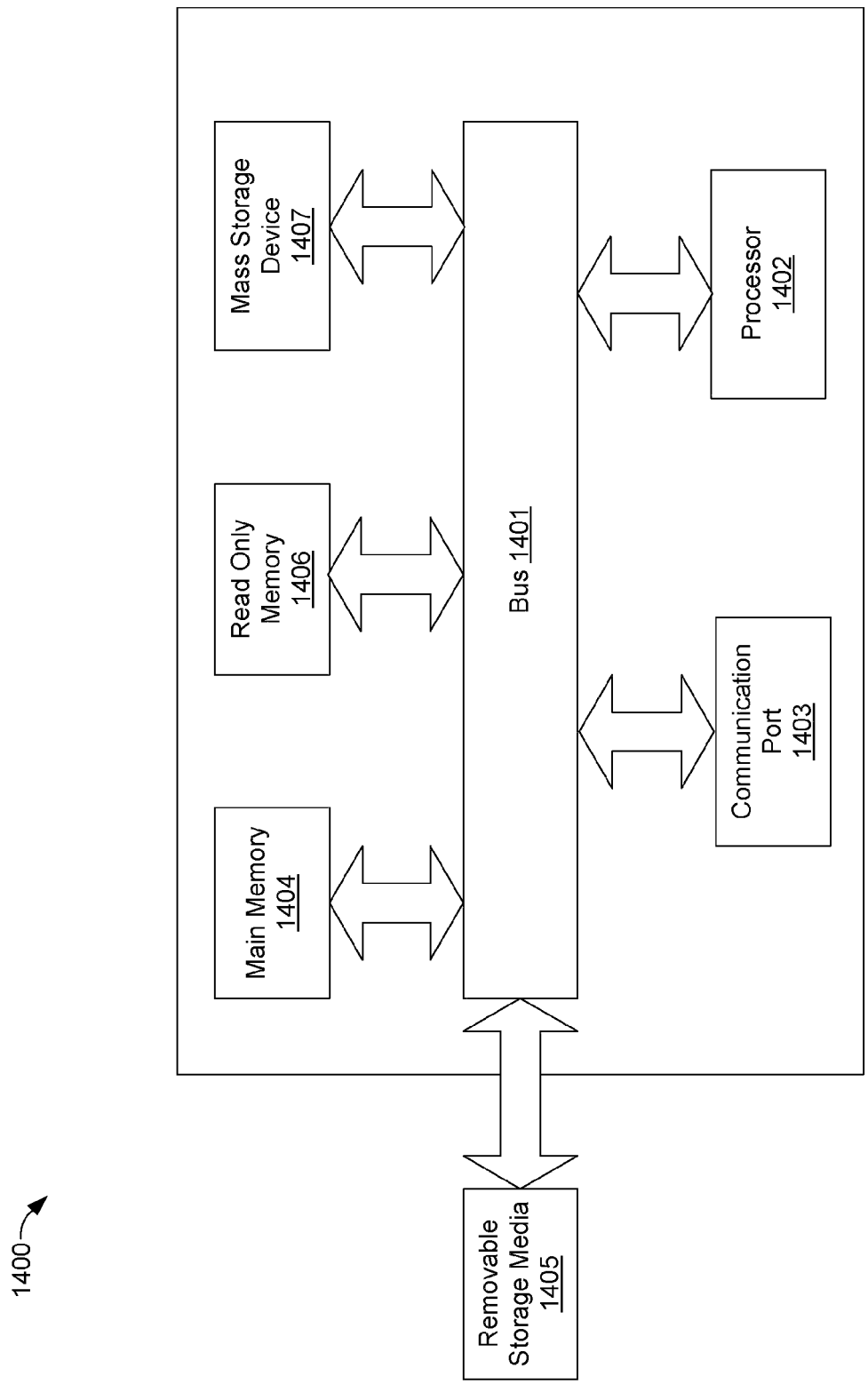
FIG. 14 illustrates an exemplary computing system that may be used to implement various portions of a trusted network in accordance with various embodiments.

FIGS. 8-13 illustrate processes that can be carried out by computing devices, such as the computing device illustrated in FIG. 14. In some embodiments, the processes are carried out within an operating environment such as the operating environment shown in FIG. 1. The processes may be embodied in computer-executable instructions to cause a computer to perform the processes. It is to be understood that the invention is not limited to the orders of operations illustrated in the embodiments below. The operations can be reordered as may be suitable for any particular implementation. In addition, the illustrated operations can be combined, rearranged, and/or broken out in various ways, without departing from the scope of the present invention.

Figure 8:
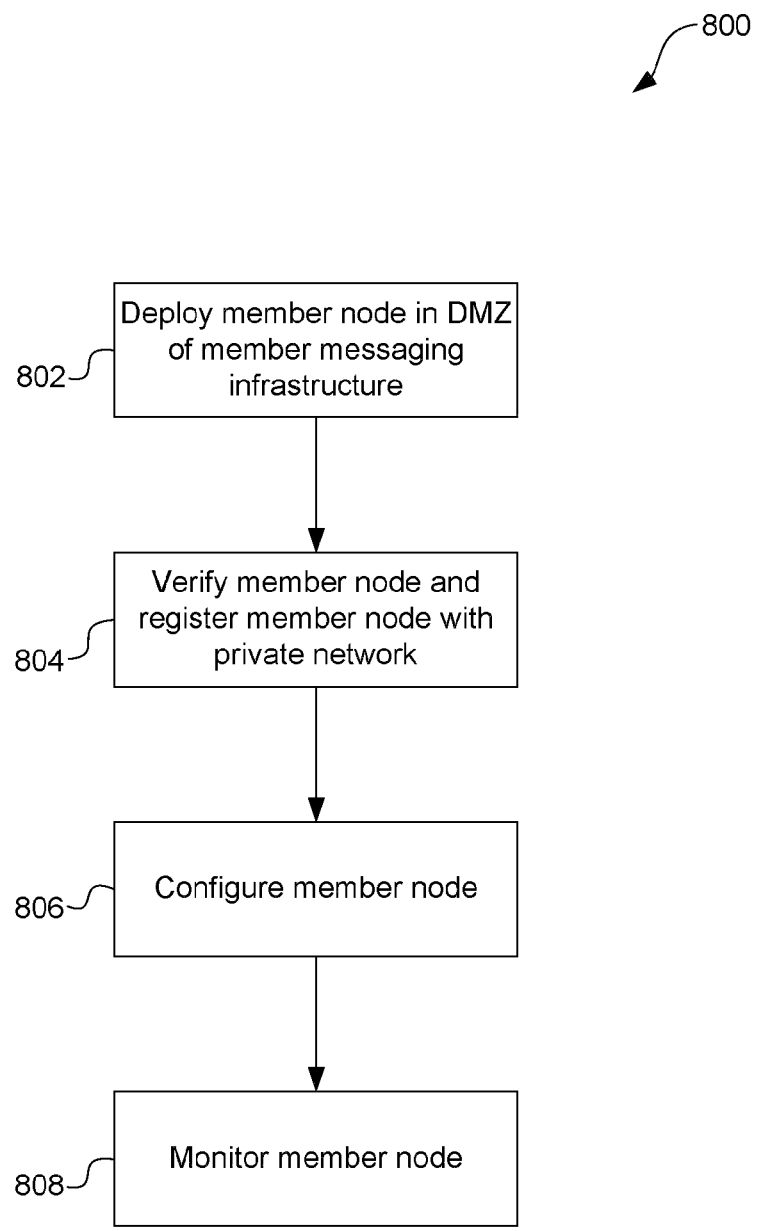
FIG. 8 is a flowchart illustrating a process for provisioning and administering a member message transfer node in accordance with one embodiment.

FIG. 8 is a flowchart illustrating a provisioning and administering process 800 for provisioning and administering a member message transfer node within a member network in accordance with one embodiment.

In a deploying operation 802, the member message transfer node is deployed to a member network. The deploying operation 802 could include physical installation, and may also include configuring the member message transfer node to work with the member network's message exchange server. A registering operation 804 registers the member message transfer node with the private network. In various embodiments, the member message transfer node is registered with a member message transfer node administrator at the private network. Registration involves the appliance uniquely identifying itself to the private network, so that the private network can determine whether the member message transfer node is authentic and valid. In one embodiment, the member message transfer node identifies itself with a digital certificate, and the private network verifies the authenticity of the certificate.

A configuring operation 806 configures the member message transfer node by setting it up to work with the private network administrator and MTAs. Configuring involves provisioning the member message transfer node by downloading (or uploading) software (e.g., data and/or executable programs) to the member message transfer node. For example, a member policy, or a portion of a member policy, is typically loaded on the member message transfer node to cause the member message transfer node to apply front line filter rules, and other rules to outbound messages transmitted from the member network. The data and software may include one or more keys as part of a Public Key Infrastructure (PKI).

After the member message transfer node is deployed, registered and configured, a monitoring operation 808 monitors member message transfer node operation. Monitoring may be performed by the member message transfer node administrator at the private network. The monitoring operation 808 may involve monitoring for a periodic heartbeat signal from the member message transfer node or pinging the member node to determine availability.

Figure 9:
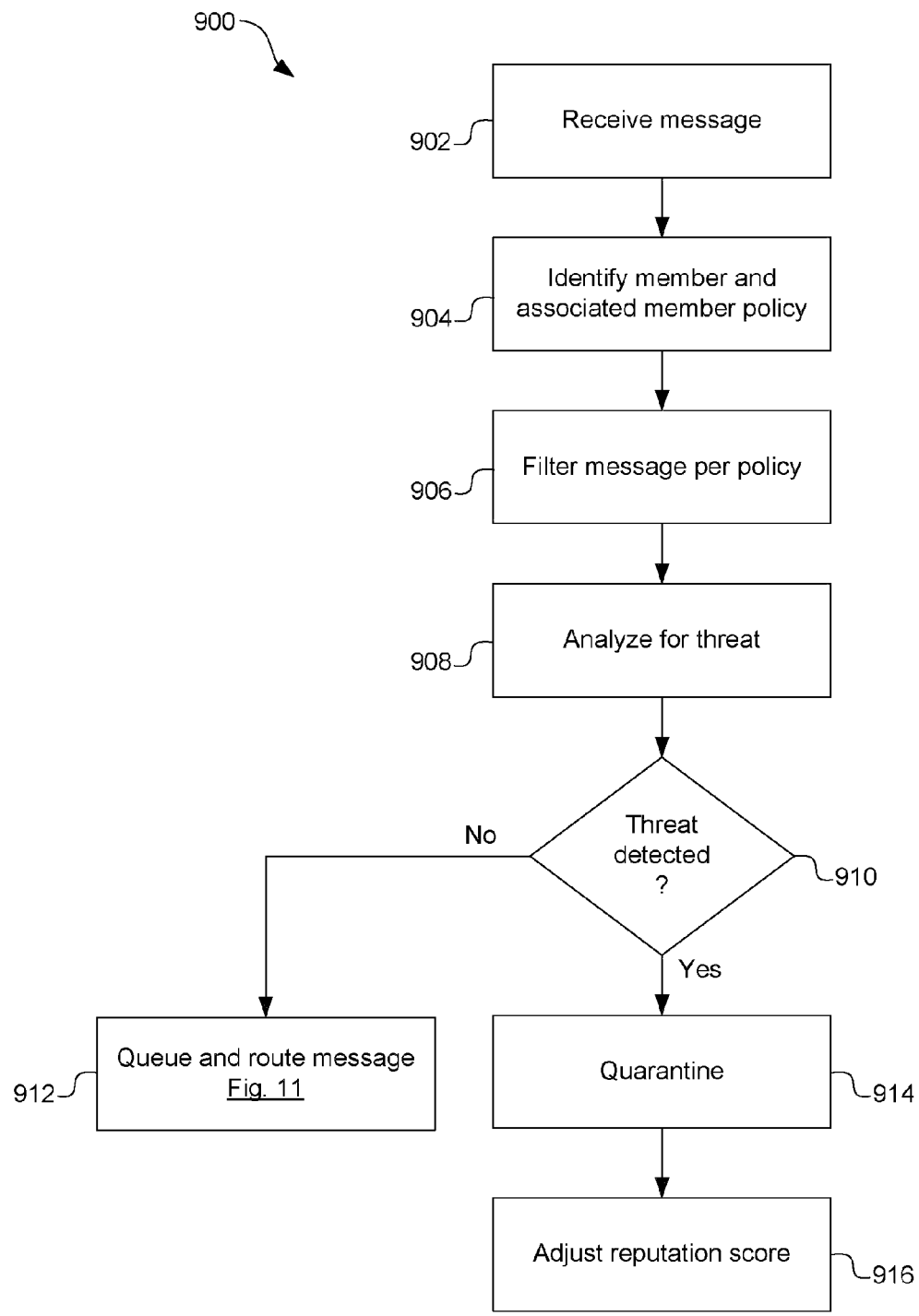
FIG. 9 is a flowchart illustrating a process for monitoring outbound messages from a member in order to create trust among members in the private network and quantify member reputation in accordance with one embodiment.

FIG. 9 is a flowchart illustrating a process for carry out transactions based on outbound messages from a member of the private network, whereby trust can be built among members and nonmembers' perception of members' trustworthiness can be enhanced.

In a receiving operation 902, a message is received from an end user node on a member network. An identifying operation 904 identifies the member and the member's policy. A filtering operation 906 filters the message according to the member's policy. An analyzing operation 908 analyzes the message to determine if the message includes pollution that is a threat.

Figure 11:
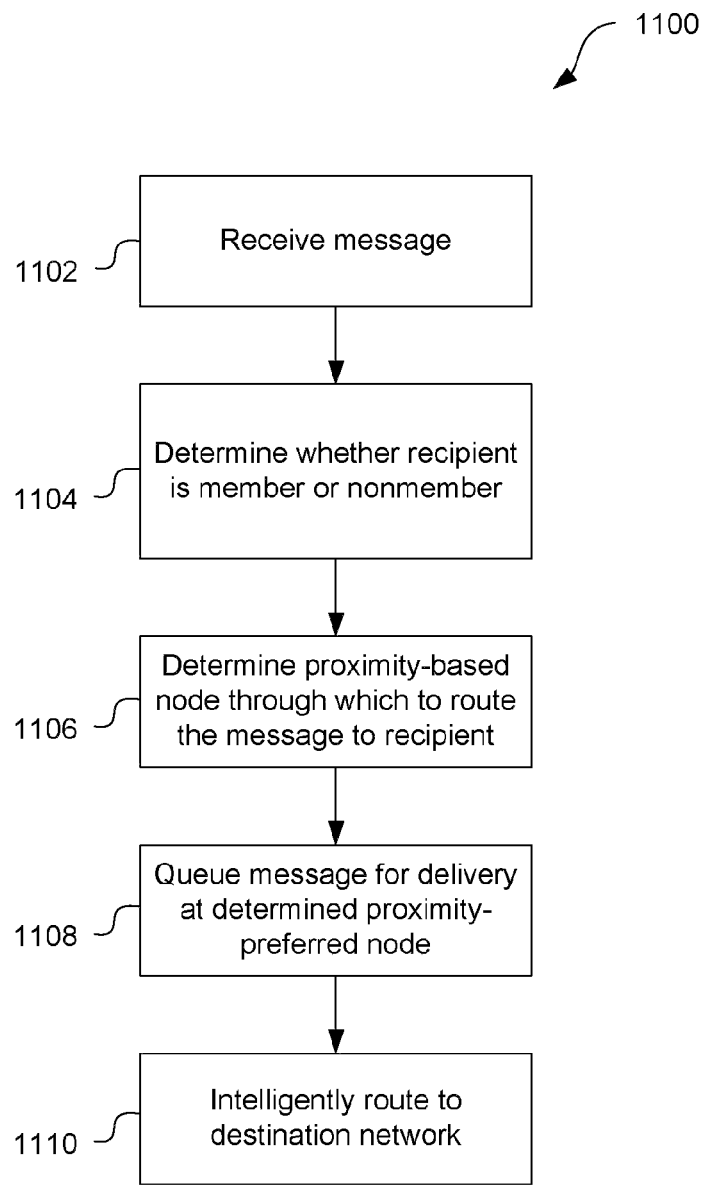
FIG. 11 is a flowchart illustrating a process for routing messages from a member to recipients in accordance with one embodiment.

A query operation 910 queries whether a threat is detected in the message. If no threat is detected, the process 900 branches "No" to a queuing operation 912, which queues the message for routing to the recipient. An exemplary queuing and routing operation is illustrated in FIG. 11.

On the other hand, if query operation 910 determines that a threat is detected in the message, the process 900 branches "yes" to a quarantining operation 914. In one embodiment of the quarantining operation 914, the message is stored in and outbound quarantine area, where it can be kept for later analysis. And adjusting operation 916 then adjusts a reputation score of the member based on the detected threat, and/or other statistics.

Figure 10:
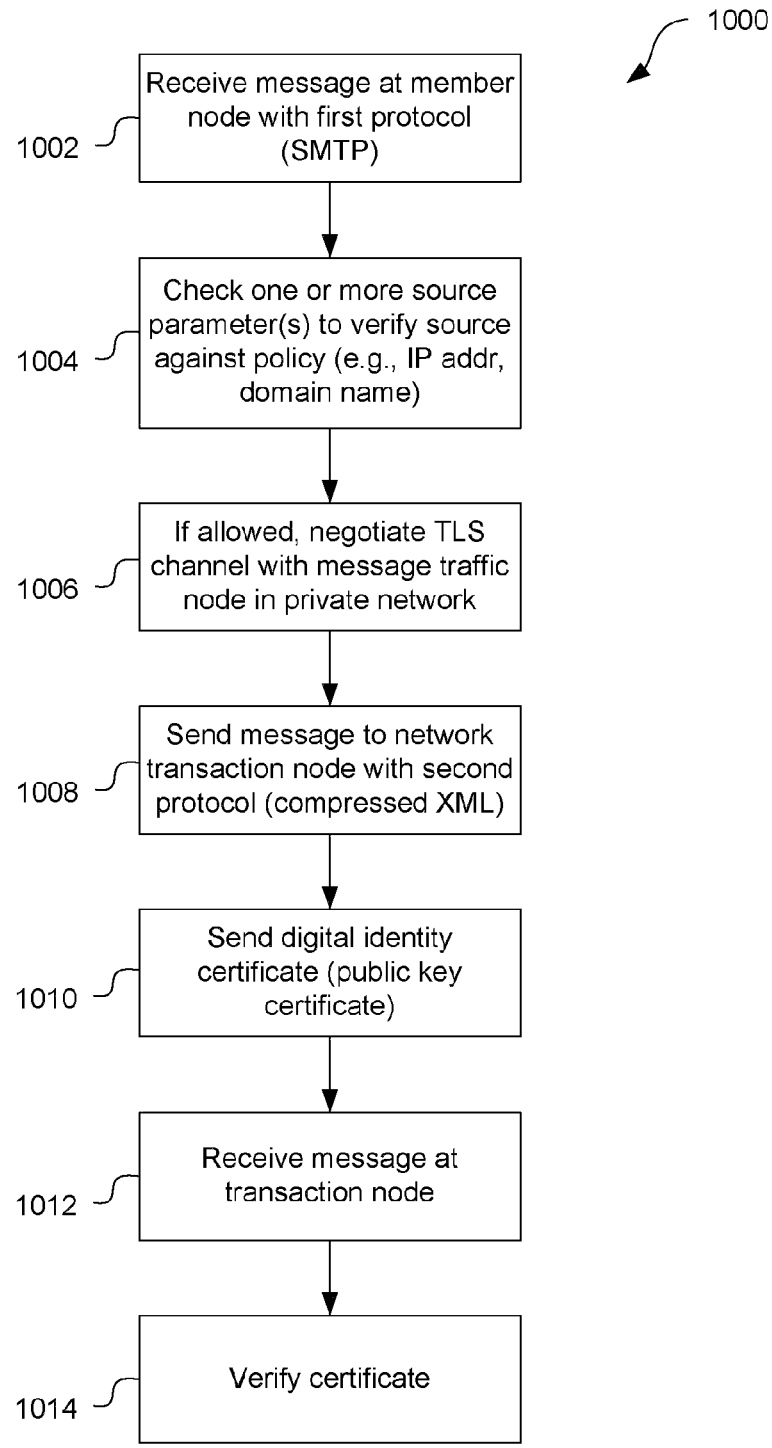
FIG. 10 is a flowchart illustrating a process for submitting outbound messages to the private network processing hub from a member in accordance with one embodiment.

FIG. 10 is a flowchart illustrating a process 1000 for submitting outbound messages to the private network from a member in accordance with one embodiment. The process 1000 can be carried out in a trusted network environment such as the environment shown in FIG. 1.

A receiving operation 1002 receives a message at a member message transfer node in the DMZ of the member's network. The message is received according to a member internal message protocol, such as SMTP. In a checking operation 1004, the member message transfer node checks one or more source parameters of the message to verify the source of the message against the member policy. Exemplary source parameters that could be checked are IP address and domain name.

If the checking operation 1004 determines that the message is from an allowed source, a negotiating operation 1006 negotiates a secure channel with the message traffic node of the private network. In one embodiment a SSL/TLS channel is negotiated. In a sending operation 1008, the member message transfer node securely sends the message to and MTA at the private network in out external message protocol, such as XML format. In various embodiments, submission to the private network can be performed through backup MTAs if the primary MTA is unavailable.

Another sending operation 1010 sends identification indicia, such as a digital certificate, to the MTA. In one embodiment, the certificate is a public key certificate. The identification indicia are used to authenticate the identity of the sending member message transfer node. This prevents unknown nodes from sending messages into the private network MTA. In a receiving operation 1012, the sent message and certificate are received by the MTA. A verifying operation 1014 then verifies the certificate. If valid, the message is approved for outbound processing in the private network.

If the member message transfer node is unavailable (e.g., not operating), in some embodiments, a backup qualified node can submit the message from the member network to the private network. In these embodiments, the backup server may be a configurable host server, such as an exchange server, that submits SMTP authenticated messages into the private network. In these situations, the MTA at the private network receives the message via a authenticated SMTP.

In accordance with various embodiments, when messages are being submitted into the member network, they are submitted in XML to the member message transfer node under normal operating conditions. If the member message transfer node becomes unavailable (e.g., crashes), a redundant inbound message server can be utilized. In some cases, the MTA at the private network uses the domain name system (DNS) to look up the public mail exchange (MX) server record of the member network, and submits the message to the listed server.

FIG. 11 is a flowchart illustrating a process 1100 for routing messages outbound from a member network to message recipients in accordance with one embodiment. The process may be carried out in a trusted network environment such as the environment shown in FIG. 1.

In a receiving operation 1102, a message is received by a private network MTA from the member network. It is assumed that authenticity checks and message filtering has been performed and determined that the message is allowed to be delivered to the intended recipient. A determining operation 1104 determines whether the recipient is a member or nonmember to determine how to route the message.

In another determining operation 1106, a preferred node is determined based on logical proximity of the recipient to the MTA. The preferred node may be a node outside the private network, in the case of a nonmember recipient, or the node may be a node within the private network, in the case of a member recipient. Choosing a routing node based on logical proximity can have benefits of more efficient or faster routing and delivery.

In a queuing operation 1108 the message is queued for delivery at the determined proximity preferred node. In a routing operation 1110, the message is intelligently routed toward the recipient. In accordance with some embodiments, the routing operation 1110 utilizes an anycast or multicast addressing scheme. In some embodiments, the private network has a peering arrangement with a backbone network, whereby the private network MTA can identify efficient routes for the message based on various routing criteria. In other embodiments, member nodes may be directly connected to the private network with private leased lines, which are only used for the purpose of interacting with the private network.

FIG. 12 is a flowchart illustrating a process 1200 for managing member reputation based at least in part on outbound message monitoring in accordance with one embodiment. The process may be carried out in a trusted network environment such as that shown in FIG. 1.

A monitoring operation 1202 monitors outbound message traffic from the member network. A detecting operation 1204 detects and contains any threats found in outbound messages. A logging operation 1206 logs the detected threats. An identifying operation 1207 identifies bots and botnets operating on the member's network. Identifying bots and botnets can be performed by detecting behavior-based anomalies. Behavior-based anomalies may be identified by analyzing message characteristics, such as, but not limited to:

message volume per hour
message trends over days
sudden changes in end user agent The member's reputation score may be updated 1208 based on detected threats and/or bots. Depending on threat characteristics, such as types, and numbers, the reputation score may be reduced. In a penalizing operation 1210, the member may be penalized if the reputation score falls below a minimum value. Penalties may include loss of access to services, higher service fees, member guarantees to address an in-network source of pollution, or others. In an applying operation 1212, one or more message identifiers are inserted into the outbound message by the MTA for various purposes. Exemplary types of message IDs and/or signatures that can be inserted are:

a message tracking ID,
an integrity checksum signature,
a bounce tracking message ID,
a sender authentication tracking message ID.

In one embodiment, the message tracking ID is a hash ID of one or more parts of the message, or the entire message along with attachments. With the message tracking ID, an external call-back request can be made to validate the origin of the message, review message details and/or to receive delivery status of the message.

An integrity checksum signature is a header that is inserted into the message. The integrity signature can be used to verify that the message has not been modified during transmission, or to validate that the message originated from the indicated sender and went through the private network. In some embodiments, the signature is a checksum or hash over one or more parts of the message. The bounce tracking ID is a hash of one or more parts of the message that is inserted into the message, and replaces the sender envelope ID.

The sender authentication tracking ID is hash of one or more parts of the message that is inserted into the host portion of the sender envelope as a sub-domain name. Thus, for example, if the hash ID is "12345ABCDEF", the sender envelope "joe_sender@joe_domain.com" may be replaced with joe_sender@12345ABCDEF.private_network.com". When a third party performs an authentication request using the subdomain, the authentication request can be tracked if the member has specified in its policy that it wants to track DNS authentication requests.

If the message is rejected (e.g., bounces) from the recipient network, a managing operation 1214 handles the bounced message. In one embodiment, the bounce management operation 1214 identifies authorized bounced messages using a VERP address verification mechanism. In this approach, a bounced message is validated by determining whether the SMTP sender address includes a valid hash ID that was inserted into the message prior to the message being sent. If the sender information matches a valid hash ID, the message is determined to have been sent by the processing hub. Using the hash ID, the message can be identified as a bounced message and tracked appropriately.

FIG. 13 is a flowchart illustrating a process 1300 for relationship discovery in accordance with one embodiment. The process 1300 may be carried out in a trusted operating environment such as the environment shown in FIG. 1, in which outbound messages from member networks are filtered and routed through a private network processing hub. As discussed above, in various embodiments a hash ID is created for each outbound message sent from the processing hub, and the hash ID can be used to validate that the corresponding message originated from the member network and/or to retrieve delivery status of the message (e.g., from an audit database).

In a filtering operation 1302 member network messages are filtered according to message sender and message recipient. In one embodiment, a filter module at an MTA node extracts sender ("From") information and recipient ("To") information from email messages. In a logging operation 1304, the extracted sender and recipient information is stored. Sender and recipient data can be stored in an audit database.

An analyzing operation 1306 analyzes the stored sender and recipient data. In some embodiments of the analyzing operation 1306 a report is generated that shows the number of messages being sent to identified recipients. The recipients may be identified by domain name, corporate name, IP address or otherwise. The analysis may also include statistics about the recipients, such as whether they are members or nonmembers, domain "whois" information, size, location, market place, etc.

In a query operation 1308, it is determined whether a nonmember invitation process is triggered and, if so, the invitation policy to be applied. In some embodiments, if the number of messages sent to a certain recipient is more than a specified threshold, the invitation process is triggered. The query operation 1308 then determines the member's invitation policy. The member's invitation policy can specify that an invitation should be sent, a request for white-listing be made, or neither. If neither are selected, the process 1300 branches "None" to a return operation 1310, wherein the process 1300 ends.

However, if the invitation policy indicates that an invitation is to be made, the process 1300 branches "Invite" to another query operation 1312, which determines whether the invitation is to be sent directly by the associated member, or the invitation is to be sent by the private network administrator on behalf of the member network. Again, the member's policy can specify the manner in which an invitation is to be made. If the invitation is to be made on behalf of the member, the process 1300 branches "On behalf" to an inviting operation 1314. In the inviting operation 1314, the private network administrator invites the nonmember to register with the private network. If the invitation policy specifies inviting directly from the member, the process 1300 branches "From member" to another inviting operation 1316, in which the member directly invites the nonmember to register.

Regardless of how the invitation is made to the nonmember, in a registering operation 1318, the nonmember is registered if the nonmember accepts the invitation. The registering operation 1318 involves deploying a message transfer node to the nonmember network, configuring the message transfer node, and registering the message transfer node with the processing hub. Registration can involve authenticating a certificate from the message transfer node.

Referring again to the query operation 1308, if the invitation policy specifies white-listing request, the process 1300 branches "White-list" to a requesting operation 1320. In the requesting operation 1320, a request is sent to the nonmember to white-list one or more members. If the nonmember accepts the request to white list one or more private network members, the nonmember may put the private network's public network MTA IP addresses on a white list that is used by the nonmembers' inbound filtering software. As a result, messages from white listed members will automatically avoid filtering. After the registering operation 1318 and/or the requesting operation 1320, the process 1300 ends at the returning operation 1310.

Exemplary Computer System Overview

Embodiments of the present invention include various steps, which are described above. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 14 illustrates an exemplary computer system 1400, such as a workstation, personal computer, client, server or gateway, upon which or with which embodiments of the present invention may be utilized.

According to the present example, the computer system includes a bus 1401, at least one processor 1402, at least one communication port 1403, a main memory 1404, a removable storage media 1405 a read only memory 1406, and a mass storage 1407.

Processor(s) 1402 can be any known processor, such as, but not limited to, an Intel® Itanium® or Itanium 2 processor(s), or AMD® Opteron® or Athlon MP® processor(s), or Motorola® lines of processors. Communication port(s) 1403 can be any of an RS-232 port for use with a modem based dialup connection, a 10/100 Ethernet port, or a Gigabit port using copper or fiber. Communication port(s) 1403 may be chosen depending on a network such a Local Area Network (LAN), Wide Area Network (WAN), or any network to which the computer system 1400 connects.

Main memory 1404 can be Random Access Memory (RAM), or any other dynamic storage device(s) commonly known in the art. Read only memory 1406 can be any static storage device(s) such as Programmable Read Only Memory (PROM) chips for storing static information such as instructions for processor 1402.

Mass storage 1407 can be used to store information and instructions. For example, hard disks such as the Adaptec® family of SCSI drives, an optical disc, an array of disks such as RAID, such as the Adaptec family of RAID drives, or any other mass storage devices may be used.

Bus 1401 communicatively couples processor(s) 1402 with the other memory, storage and communication blocks. Bus 1401 can be a PCI/PCI-X or SCSI based system bus depending on the storage devices used.

Removable storage media 1405 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives.

The components described above are meant to exemplify some types of possibilities. In no way should the aforementioned examples limit the scope of the invention, as they are only exemplary embodiments.

In conclusion, embodiments of the present invention provide novel systems and methods for providing a trusted communication network by routing outbound message traffic through a private network configured to filter outbound messages, detect threats, maintain a reputation metric, provide reputation management services, and perform relationship discovery. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A gateway, comprising:
a processor; and
one or more non-transitory, machine-readable media coupled to the processor;
wherein the one or more non-transitory machine-readable media have stored instructions thereon, which, if executed by the gateway, cause the gateway to determine whether to send an outbound message from a member to at least one message recipient of the outbound message, said determination further comprising
applying one or more filters to the outbound message, wherein the one or more filters include a spam filter;
modifying the outbound message to prevent a bounce attack;
extracting an attachment from the outbound message, when the attachment is filtered;
in response to detecting spam, quarantining the outbound message in an outbound quarantine without sending the outbound message to the at least one message recipient;
applying a disposition policy to the quarantined message; and
managing reputation feedback of the member based on the detected spam, wherein the member is penalized with a loss of access to a service, if the reputation feedback falls below a minimum value.

2. The gateway of claim 1, wherein the outbound message originates from an end user node on a member network; and
the determination further comprises:
identifying the member corresponding to the end user node, and a policy of the member; and
applying the one or more filters to the outbound message according to the policy of the member.

3. The gateway of claim 1, wherein:
the one or more filters include a filter that determines whether the outbound message is indicative of a behavior-based anomaly;
the behavior-based anomaly indicates that a bot is resident on a node in an enterprise network; and
the determination further comprises, in response to detecting the behavior-based anomaly, quarantining all messages sent from the node within the enterprise network.

4. The gateway of claim 1, wherein the outbound message originates from an end user node corresponding to the member on a member network; and
the one or more filters comprise a filter which filters the outbound message based on a reputation score of the member.

5. The gateway of claim 1, wherein the applying the one or more filters comprises filtering the outbound message based on one or more Simple Mail Transport Protocol attributes.

6. The gateway of claim 1, wherein:
the one or more filters include a content filter for detecting content-related threats, the content filter specifies message profanity, pornography, undesirable content, or questionable content be filtered for quarantining; and
the determination further comprises, in response to detecting a content-related threat, quarantining the outbound message without sending the outbound message to the at least one message recipient.

7. The gateway of claim 1, wherein the disposition policy is selected from the following:
quarantine until release,
bounce back to specified enterprise network user,
delete without sending,
deliver after a specified time, and
deliver only after approval.

8. The gateway of claim 1, wherein the one or more non-transitory, machine-readable media includes RAID storage.

9. The gateway of claim 1, wherein the spam filter determines whether the outbound message includes a content-related threat.

10. The gateway of claim 1, wherein the outbound message is an instant message.

11. The gateway of claim 1, wherein the outbound message is an email message.

12. The gateway of claim 1, wherein the disposition policy is a deliver only after approval policy.

13. The gateway of claim 1, wherein the outbound message is modified by replacing an original envelope sender address based on a hash of one or more parts of the outbound message.

14. The gateway of claim 1, wherein the member is an enterprise.

15. The gateway of claim 1, wherein the gateway receives the outbound message from a sender and filters out a single message based on a reputation score of the sender.

16. The gateway of claim 1, wherein the member is penalized with a higher service fee or a member guarantee to address an in-network source of pollution, if the reputation feedback falls below a minimum value.

17. One or more non-transitory, computer-readable storage media having machine-executable instructions for determining whether to send an outbound message from a member to at least one message recipient of the outbound message, said instructions, when executed on a processor, configure the processor at least to:
apply one or more filters to the outbound message, wherein the one or more filters include a spam filter;
modify the outbound message to prevent a bounce attack;
extract an attachment from the outbound message, when the attachment is filtered;
in response to detecting spam, quarantine the outbound message in an outbound quarantine without sending the outbound message to the at least one message recipient;
apply a disposition policy to the quarantined message, wherein the disposition policy is a deliver only after approval policy; and
manage reputation feedback of the member based on the detected spam, wherein the member is penalized with a loss of access to a service, if the reputation feedback falls below a minimum value.

18. The one or more non-transitory, computer-readable storage media of claim 17, wherein the processor is further configured by said instructions to:
receive the outbound message from an end user node on a member network;
identify a policy of the member; and apply the one or more filters to the outbound message according to the policy of the member.

19. The one or more non-transitory, computer-readable storage media of claim 17, wherein the processor is further configured by said instructions to:
track when messages enter the outbound quarantine.

20. The one or more non-transitory, computer-readable storage media of claim 17, wherein the processor is further configured by said instructions to:
track the order in which messages are disposed from the outbound quarantine.

21. The one or more non-transitory, computer-readable storage media of claim 17, wherein the processor is further configured by said instructions to:
determine, by a billing services module, a billing amount to the member based on a duration of a retention period for quarantined messages in the outbound quarantine.

22. A method for determining whether to send an outbound message from a member to at least one message recipient of the outbound message, the method comprising:
applying one or more filters to the outbound message, wherein the one or more filters include a spam filter;
modifying the outbound message to prevent a bounce attack;
extracting an attachment from the outbound message, when the attachment is filtered;
in response to detecting spam, quarantining the outbound message without sending the outbound message to the at least one message recipient;
applying a disposition policy to the quarantined message; and
managing reputation feedback of the member based on the detected spam, wherein the member is penalized with a loss of access to a service, if the reputation feedback falls below a minimum value.

23. The method of claim 22, wherein:
the one or more filters include a filter that determines whether the outbound message is indicative of a behavior-based anomaly;
the behavior-based anomaly indicates that a bot is resident on a node in an enterprise network; and
the method further comprises, in response to detecting the behavior-based anomaly, quarantining all messages sent from the node within the enterprise network.

24. The method of claim 22, wherein:
the outbound message originates from an end user node corresponding to the member on a member network; and
the one or more filters include a filter that filters the outbound message based on a reputation score of the member.

25. The method of claim 22, wherein the applying the one or more filters comprises filtering based on one or more Simple Mail Transport Protocol attributes and content filtering, and the content filtering specifies message profanity, pornography, undesirable content, or questionable content be filtered for quarantining.

26. The method of claim 22, wherein the applying the disposition policy comprises one of the following:
deleting the outbound message without delivery after a specified amount of time;
delivering the outbound message after a specified amount of time;
delivering the outbound message only after approval;
sending the outbound message to an identified user within an enterprise network; and
sending the outbound message to a sender of the outbound message.

* * * * *